United States Patent
Bosma et al.

(10) Patent No.: US 10,960,976 B2
(45) Date of Patent: Mar. 30, 2021

(54) RAPID AERIAL EXTRACTION SYSTEMS

(71) Applicant: Modern Technology Solutions, Inc., Alexandria, VA (US)

(72) Inventors: Marinus Bernard Bosma, Tipp City, OH (US); Charles David Solomon, Huber Heights, OH (US); Peter Forrest LeHew, Catlett, VA (US)

(73) Assignee: Modern Technology Solutions, Inc., Alexandria, VA (US)

( * ) Notice: Subject to any disclaimer, the term of this patent is extended or adjusted under 35 U.S.C. 154(b) by 0 days.

(21) Appl. No.: 16/613,403

(22) PCT Filed: May 1, 2019

(86) PCT No.: PCT/US2019/030273
§ 371 (c)(1),
(2) Date: Nov. 13, 2019

(87) PCT Pub. No.: WO2019/213315
PCT Pub. Date: Nov. 7, 2019

(65) Prior Publication Data
US 2021/0047032 A1    Feb. 18, 2021

Related U.S. Application Data

(60) Provisional application No. 62/665,905, filed on May 2, 2018.

(51) Int. Cl.
*B64C 29/02* (2006.01)
*B64D 9/00* (2006.01)
*B64C 3/56* (2006.01)

(52) U.S. Cl.
CPC .............. *B64C 29/02* (2013.01); *B64D 9/00* (2013.01); *B64C 3/56* (2013.01); *B64C 2201/104* (2013.01); *B64C 2201/121* (2013.01)

(58) Field of Classification Search
CPC ......... B64C 11/28; B64C 29/00; B64C 29/02; B64C 11/46; B64C 3/56; B64C 9/00;
(Continued)

(56) References Cited

U.S. PATENT DOCUMENTS 3,259,343 A * 7/1966 Roppel ............... B64C 29/0091
244/53 R
3,350,035 A * 10/1967 Schlieben ............. B64C 39/062
244/7 R (Continued)

*Primary Examiner* — Medhat Badawi
(74) *Attorney, Agent, or Firm* — Lamon Patent Services; Cynthia S. Lamon

(57) ABSTRACT

A method for extracting a person or package from a ground point involves dropping a pod, connected to a tether, with parachute and radio from an aircraft, connected by tether line to the fixed-wing aircraft, tracking descent of the pod to an extraction point, maneuvering the fixed wing aircraft into a circular orbit creating a gravity well, donning the parachute with harness by a subject to be extracted, and altering path and speed of the fixed-wing aircraft to gradually increase tension in the tether to lift the subject in the harness from the ground point, and to accelerate the subject to an altitude and path to carry the subject in the harness to a predetermined altitude over a second ground point.

20 Claims, 25 Drawing Sheets

(58) Field of Classification Search
CPC .......... B64C 27/82; B64D 31/10; B64G 1/10; G05D 1/00
See application file for complete search history.

(56) References Cited

U.S. PATENT DOCUMENTS

| | | | | |
|---|---|---|---|---|
| 4,790,497 A * | 12/1988 | Yoffe | ................... | B64F 1/02 |
| | | | | 244/115 |
| 5,842,667 A * | 12/1998 | Jones | ................. | B64C 29/0025 |
| | | | | 244/114 R |
| 6,086,015 A * | 7/2000 | MacCready, Jr. | ....... | B64C 29/02 |
| | | | | 244/7 B |
| 9,527,596 B1 * | 12/2016 | Adams | ................. | B64C 39/024 |
| 9,963,228 B2 * | 5/2018 | McCullough | ........... | B64C 39/08 |
| 10,543,918 B1 * | 1/2020 | Kimchi | ................. | B64C 39/024 |
| 10,597,164 B2 * | 3/2020 | Oldroyd | ................. | B64D 27/24 |
| 10,604,249 B2 * | 3/2020 | McCullough | ........... | B64C 27/30 |
| 10,625,853 B2 * | 4/2020 | McCullough | ......... | B64C 39/024 |
| 10,633,088 B2 * | 4/2020 | McCullough | ........ | G05D 1/0094 |
| 10,661,892 B2 * | 5/2020 | McCullough | ........... | B64C 25/36 |
| 2003/0001045 A1 * | 1/2003 | Yifrach | ..................... | B64C 3/56 |
| | | | | 244/35 R |
| 2003/0089821 A1 * | 5/2003 | Miralles | .................... | B64C 3/56 |
| | | | | 244/49 |
| 2012/0109427 A1 * | 5/2012 | Berthier | ................. | B64C 39/024 |
| | | | | 701/15 |
| 2015/0136897 A1 * | 5/2015 | Seibel | ................. | B64C 29/0033 |
| | | | | 244/6 |
| 2015/0284079 A1 * | 10/2015 | Matsuda | ............... | B64C 39/024 |
| | | | | 244/7 A |
| 2016/0214712 A1 * | 7/2016 | Fisher | .................... | B64C 29/00 |
| 2017/0021924 A1 * | 1/2017 | Kubik | .................... | B64C 27/48 |
| 2017/0274996 A1 * | 9/2017 | Frolov | .................... | B64C 37/02 |
| 2017/0297699 A1 * | 10/2017 | Alber | .................... | B64C 11/30 |
| 2017/0327219 A1 * | 11/2017 | Alber | .................... | B64D 35/08 |
| 2017/0334557 A1 * | 11/2017 | Alber | ........................ | B64C 7/02 |
| 2018/0002012 A1 * | 1/2018 | McCullough | .......... | B64D 25/12 |
| 2018/0002013 A1 * | 1/2018 | McCullough | .......... | B64D 25/12 |
| 2018/0002014 A1 * | 1/2018 | McCullough | .......... | B64C 39/06 |
| 2018/0002015 A1 | 1/2018 | De Visscher et al. | | |
| 2018/0002016 A1 * | 1/2018 | McCullough | .......... | B64C 27/30 |
| 2018/0002027 A1 * | 1/2018 | McCullough | .......... | B64D 1/22 |
| 2019/0039728 A1 * | 2/2019 | Hutson | ............... | B64C 29/0025 |

* cited by examiner

RAPID AERIAL EXTRACTION SYSTEMS

CROSS-REFERENCE TO RELATED APPLICATIONS

The present application claims priority to PCT/US19/30273, Filed on May 1, 2019, having the title RAPID AERIAL EXTRACTION SYSTEMS, and to provisional patent application 62/665,905, filed on May 2, 2018. All disclosure of the parent application is incorporated herein at least by reference.

BACKGROUND OF THE INVENTION

1. Field of the Invention

The present invention is in the technical area of retrieving personnel and objects from ground by fixed-wing aircraft.

2. Description of Related Art

A need for apparatus and methods to find and retrieve individuals from hostile environments is well-known, such as, for example, in the circumstance of pilots and crew surviving crashes and forced landings in enemy territory, or who may have parachuted behind enemy lines from a damaged aircraft. Another such circumstance is retrieving persons who may have been injured, or are marooned or lost. In the conventional art vertical takeoff and landing (VTOL) vehicles may be used, such as helicopters and the like, but in some circumstances there may be no convenient access for a VTOL vehicle, or access by a VTOL may be impractical for other reasons.

What is needed is apparatus and procedures for providing an individual at need with necessary equipment connected to a fixed-wing aircraft at altitude, and procedures for delivering the equipment, and then extracting the individual with the equipment by fixed-wing aircraft.

BRIEF SUMMARY OF THE INVENTION

In one embodiment of the invention a method for extracting a person or package from a ground point is provided, comprising dropping an extraction pod from a fixed wing aircraft, the extraction pod carrying a parachute, an extraction harness and first wireless communication circuitry, the extraction pod connected by tether line to the fixed-wing aircraft. Software is implemented to track descent of the pod to the ground point, the software executing on a processor of the fixed-wing aircraft and second wireless communication circuitry at the fixed-wing aircraft. The fixed wing aircraft may be maneuvered into a circular orbit at a specific altitude, diameter and airspeed, creating a gravity well in which the tether describes a spiral configuration from a connected point on the circling fixed-wing aircraft to the pod at a fixed location at the ground point directly below a center-point of the circular orbit of the fixed-wing aircraft, resulting in tension in the tether insufficient to lift the pod.

Next a subject for extraction may continue the method by donning the extraction harness and the parachute by a subject to be extracted; and altering the path and speed of the fixed-wing aircraft in a manner to gradually increase tension in the tether to lift the subject in the harness from the ground point, and to accelerate the subject to an altitude and path to carry the subject in the harness to a predetermined altitude over a second ground point.

In one embodiment the method further comprises a step for tracking tension in the tether by a tension sensor in the tether line, as input to the software executing on the processor in the fixed wing aircraft, and using the tension in the tether is input in an algorithm determining the path and speed of the fixed-wing aircraft. In one embodiment the subject notifies the fixed-wing aircraft by the first to the second wireless communication circuitry of a point in time that the subject is ready to be extracted. In one embodiment the extraction pod is carried in a canister under a wing of the fixed-wing aircraft, and is dropped by opening the canister and deploying a drag chute connected to the pod, which drag chute pulls the pod from the canister. And in one embodiment, as the pod is dropped, tether line, attached to the fixed-wing aircraft, is fed from a bobbin in the pod as the pod descends.

In one embodiment of the invention, as the pod is dropped, tether line, attached to the pod, is fed from a winch at the fixed wing aircraft. In one embodiment the pod comprises drag fins that deploy after the pod is dropped, the drag fins providing stability in the path of the pod. In one embodiment the drag fins are movable, and are moved independently by signals from the fixed wing aircraft in response to information acquired in tracking the descent of the pod, causing the pod to correct trajectory of descent. In one embodiment the method further comprises releasing the harness from the tether at the second ground point, allowing the subject to fall free and deploy the parachute. And in one embodiment the subject and a person on the fixed wing aircraft are in voice communication during the extraction process.

In another aspect of the invention a system for extracting a person or package from a ground point is provided, comprising a fixed-wing aircraft having a processor executing software and first wireless communication circuitry, an extraction pod carrying a parachute, an extraction harness and first wireless communication circuitry. The extraction pod may be carried by the fixed wing aircraft and connected by tether line to the fixed-wing aircraft. The extraction pod may be dropped from the fixed-wing aircraft, descent to the ground point is tracked by software executing on a processor of the fixed-wing aircraft and second wireless communication circuitry at the fixed-wing aircraft.

The fixed-wing aircraft is maneuvered into a circular orbit at a specific altitude, diameter and airspeed, creating a gravity well in which the tether line describes a spiral configuration from a connected point on the circling fixed-wing aircraft to the pod at a fixed location at the ground point directly below a center-point of the circular orbit of the fixed-wing aircraft, resulting in tension in the tether insufficient to lift the pod. The extraction harness and the parachute are donned by a subject to be extracted, and the path and speed of the fixed-wing aircraft is altered in a manner to gradually increase tension in the tether to lift the subject in the harness from the ground point, and to accelerate the subject to an altitude and path to carry the subject in the harness to a predetermined altitude over a second ground point.

In one embodiment of the system tension in the tether is tracked by a tension sensor in the tether line, as input to the software executing on the processor in the fixed wing aircraft, and the tension in the tether is used as input in an algorithm to determine the path and speed of the fixed-wing aircraft. Also, in one embodiment the subject notifies the fixed-wing aircraft by the first to the second wireless communication circuitry of a point in time that the subject is ready to be extracted. Also in one embodiment the system further comprises a canister wherein the extraction pod is carried under a wing of the fixed-wing aircraft, and is deployed by opening the canister and deploying a drag chute connected to the pod, which drag chute pulls the pod from the canister. And in one embodiment, as the pod is dropped, tether line, attached to the fixed-wing aircraft, is fed from a bobbin in the pod as the pod descends.

In one embodiment of the system, as the pod is dropped, tether line, attached to the pod, is fed from a winch at the fixed wing aircraft. Also in one embodiment the pod comprises drag fins that deploy after the pod is dropped, the drag fins providing stability in the path of the pod. In one embodiment the drag fins are movable, and are moved independently by signals from the fixed wing aircraft in response to information acquired in tracking the descent of the pod, causing the pod to correct trajectory of descent. In one embodiment the system further comprises releasing the harness from the tether at the second ground point, allowing the subject to fall free and deploy the parachute. And in one embodiment the subject and a person on the fixed wing aircraft are in voice communication during the extraction process.

DETAILED DESCRIPTION OF THE INVENTION

In various embodiments of the present invention a system is provided for extraction of personnel or objects from a fixed point on the surface of the Earth by a fixed-wing aircraft. The unique process employs precise deployment of an equipment-carrying pod from the aircraft to a pre-determined point on the surface, the pod tethered to the aircraft at all times, and establishing a circular orbit by the aircraft at altitude over the point on the surface, with the tether to the pod in a spiral in a gravity-well. An individual at the point on the surface opens the pod, dons an escape harness coupled to the tether, including a parachute, and signals the aircraft when ready. The aircraft leaves the orbit, and performs in some cases altitude adjustment, which withdraws slack in the tether, lifting the escape harness with the individual gradually from the surface and away to a safe area where the individual may parachute to safety.

Figure 1:
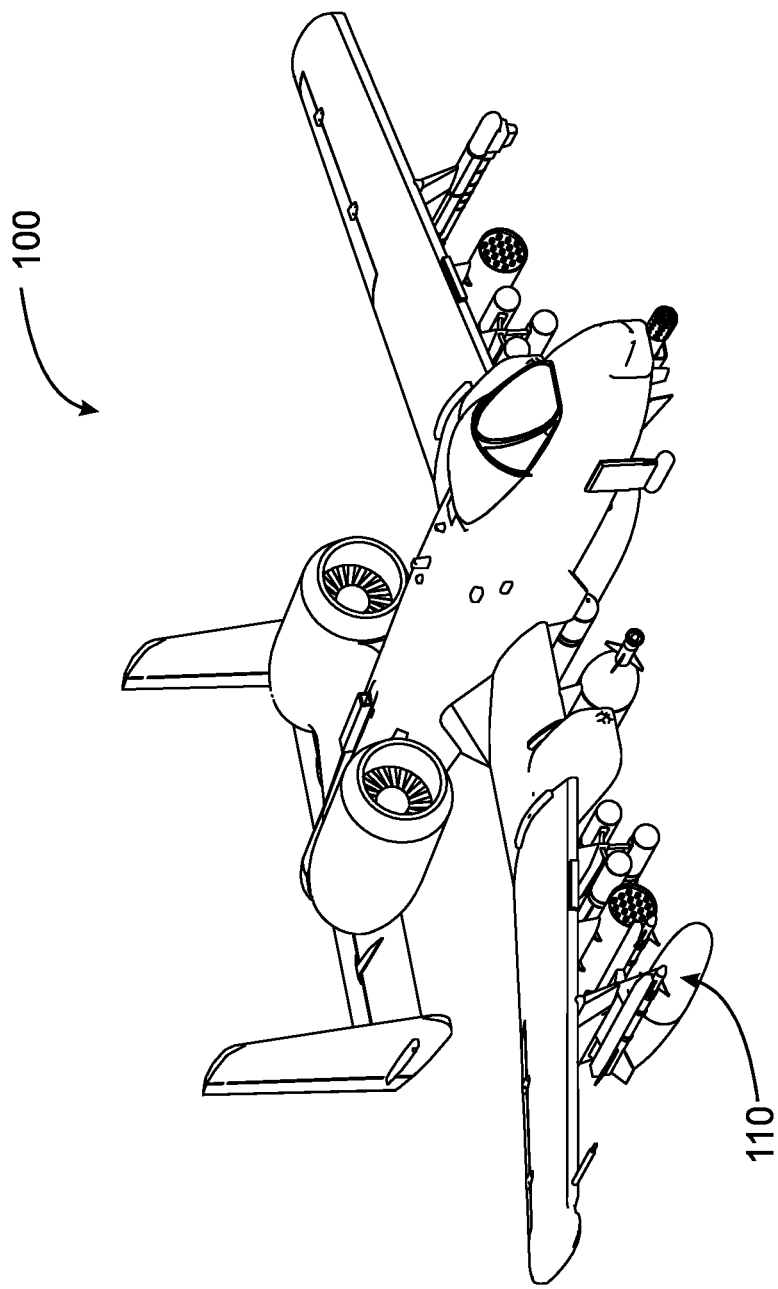
FIG. 1 is a perspective view of a fixed-wing aircraft suitable for employment in embodiments of the present invention.

FIG. 1 is a perspective view of a fixed-wing aircraft 100 suitable for employment in embodiments of the present invention, the aircraft carrying a pod 110 under a wing. In this example the aircraft is an A-10 Warthog, often termed a Hog. Many other aircraft may be similarly employed, and the invention is not limited to the A-10 aircraft. Although not apparent in FIG. 1 the pod carries a bobbin with a substantial length of line, the bobbin positioned at an end of the pod that will face the aircraft in deployment, and the tether is fixedly attached to the aircraft, usually at the point the pod is carried.

Figure 2:
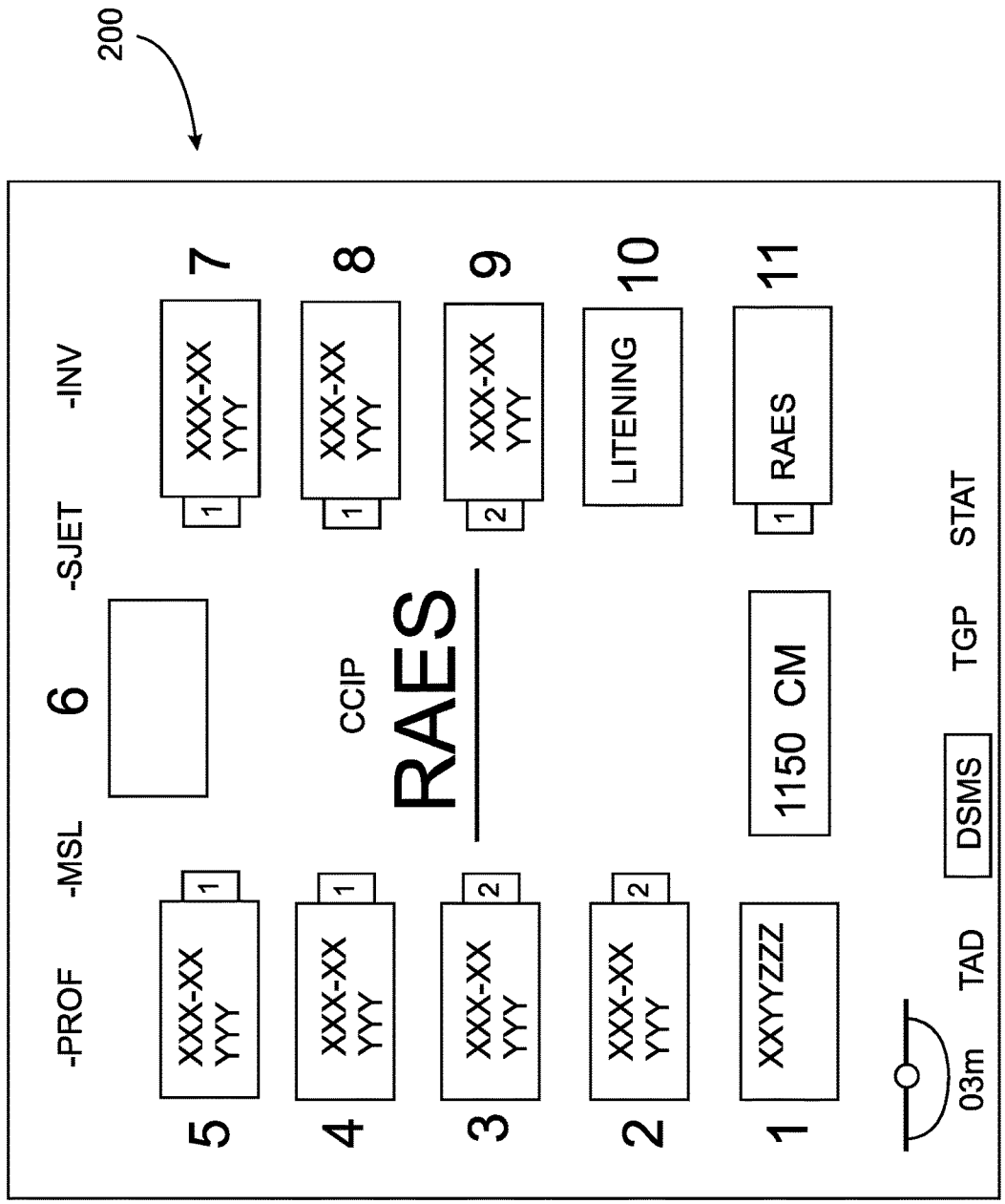
FIG. 2 is an exemplary view of a touch-screen control pad useful in control of procedures in embodiments of the present invention.

FIG. 2 is an exemplary illustration of a touchscreen interactive interface 200 that is used in a cockpit of aircraft 100 to enable a pilot to control deployment of pod 110 and navigation of aircraft 100 to deploy the pod to a predetermined position on ground surface, and to maintain the pod position until an individual has interacted with the pod, and is ready for extraction. The interactive interface comprises readouts for exhibiting characteristics of the pod and aircraft positions during an operation, and command inputs for various functions, such as pod deployment.

Figure 3:
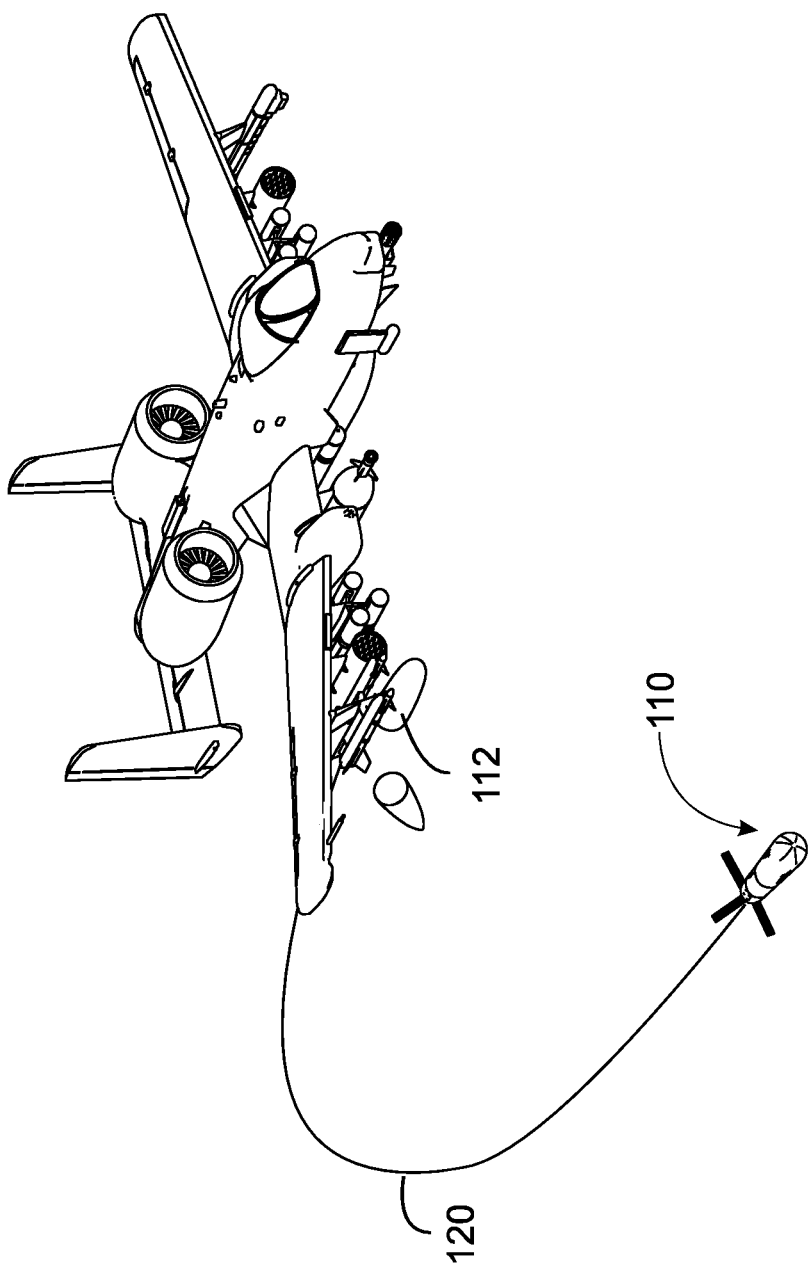
FIG. 3 is a perspective view of a fixed-wing aircraft deploying an equipment carrying pod in an embodiment of the present invention.

FIG. 3 is a perspective view of an aircraft 100 deploying equipment-carrying pod 110 in an embodiment of the present invention. Pod 110 in this example is carried in a capsule 112 prior to deployment, and at time of deployment a rear-section of capsule 112 is jettisoned, and pod 110 is pulled from the capsule by a drag chute, not shown, which is jettisoned after deployment. In FIG. 3 pod 110 is in free fall, but is still connected to aircraft 100 by tether 120, which unwinds from a bobbin in the pod, as is described in additional detail below.

Figure 4:
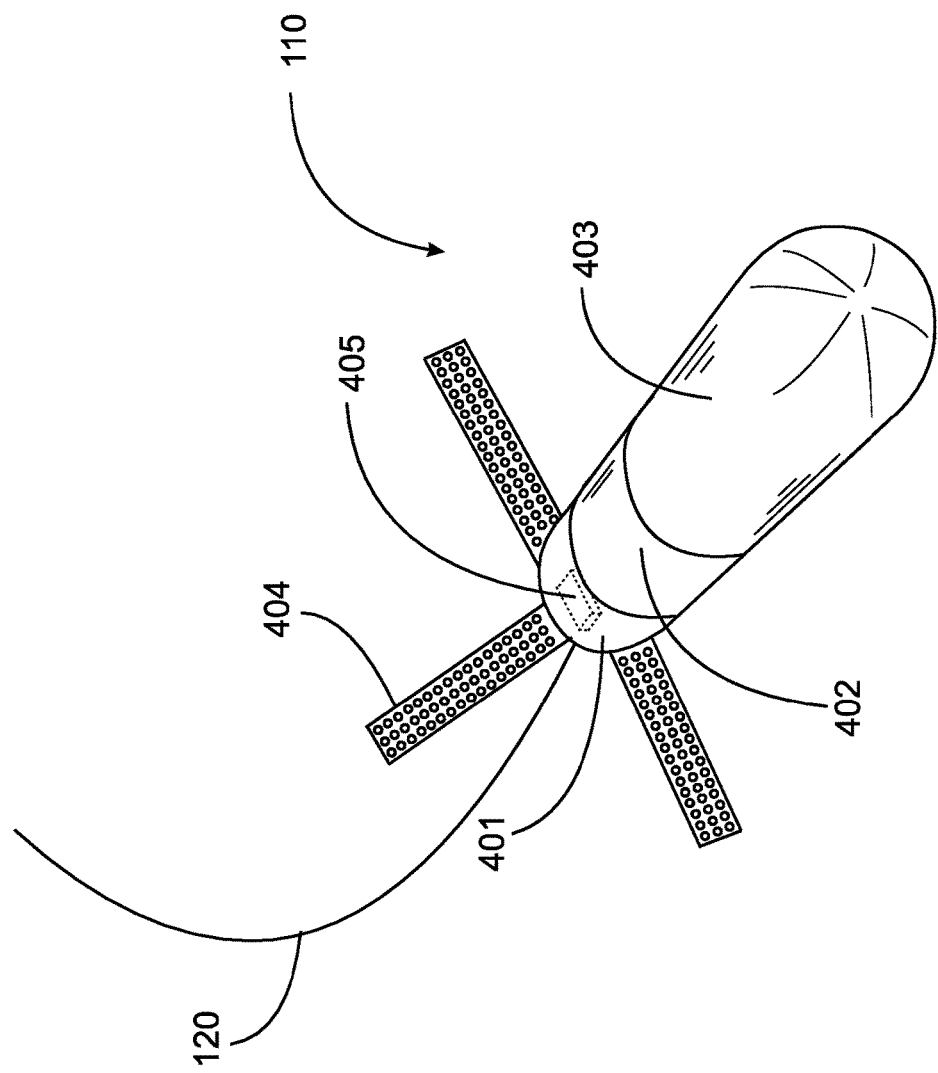
FIG. 4 is an expanded view of a pod in descent from a fixed wing aircraft in an embodiment of the invention.

FIG. 4 is an expanded view pod 110 in descent from aircraft 100 in an embodiment of the invention. Pod 110 is seen to have elements 404, termed grid fins that stabilize the pod in flight, much as many bombs may be stabilized. Elements 404 may also be movable, and may be used to maneuver the pod in its path of descent.

There are, in the pod, three essential sections. Section 401, may be at the rear of the pod and houses the bobbin described briefly above. The bobbin feeds tether line out the rear of the pod. The feed of the tether line is substantially friction free, so the feeding of the tether from the bobbin has little or no effect on the flight path of the pod.

Section 402 of pod 110 houses a packed parachute that enables an individual in a later extraction process to eventually parachute to a safe area. Section 403 houses an extraction harness, including a vest and peripheral equipment, for the individual to be extracted. The harness may be anchored to the tether at a point on the harness that allows the individual, when extracted, to remain upright and aware of surroundings. The harness also comprises radio circuitry and power supply that enables the individual to communicate with the pilot of aircraft 100 during the extraction process, for instance, to notify the pilot that the individual is ready to be lifted and extracted.

In some embodiments the pod has a CPU and digital circuitry 405 for performing a number of functions. Grid fins 404 may, in some embodiments be movable independently to slow the pod, speed up the pod, or to urge a change in direction for the pod. In the steerable embodiments the pod may also comprise radio communication circuitry, whereby the pod may interact with software in the fixed-wing aircraft, The systems in the aircraft may, for example, track trajectory of the pod, determine deviation from desired trajectory, and may manipulate drag fins 404, for example, to correct trajectory. A critical element in the system is a bobbin in section 401 of the pod that presents the tether 120 in a manner to feed the tether out of the rear of the pod as the pod descends.

Figures 5A, 5B:
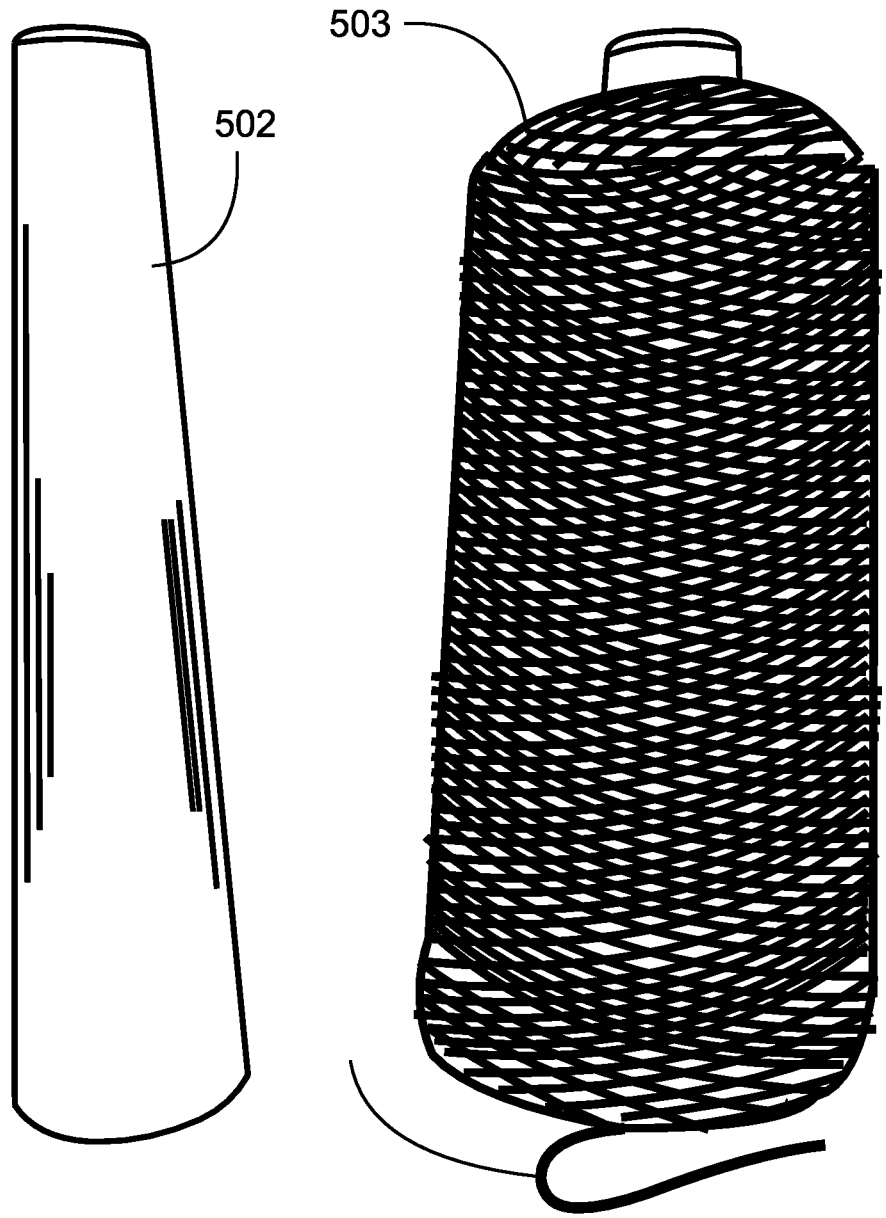
FIG. 5A illustrates a core upon which a bobbin is wound in an embodiment of the invention.
FIG. 5B illustrates a bobbin of tether line wound in the core of FIG. 5A.

FIG. 5A illustrates a core 502 upon which tether line may be wound to create the bobbin. In this example the core has a circular cross section but is not strictly cylindrical. The core is larger in diameter on one end than the other, to be somewhat cone-shaped, but may not be strictly conical. In this example the cone is inclined. FIG. 5B illustrates tether line 120 wound on the core of FIG. 5A. The wound line removed as a unit from core 502 forms bobbin 503 which is installed in section 401 of pod 110.

Figure 5C:
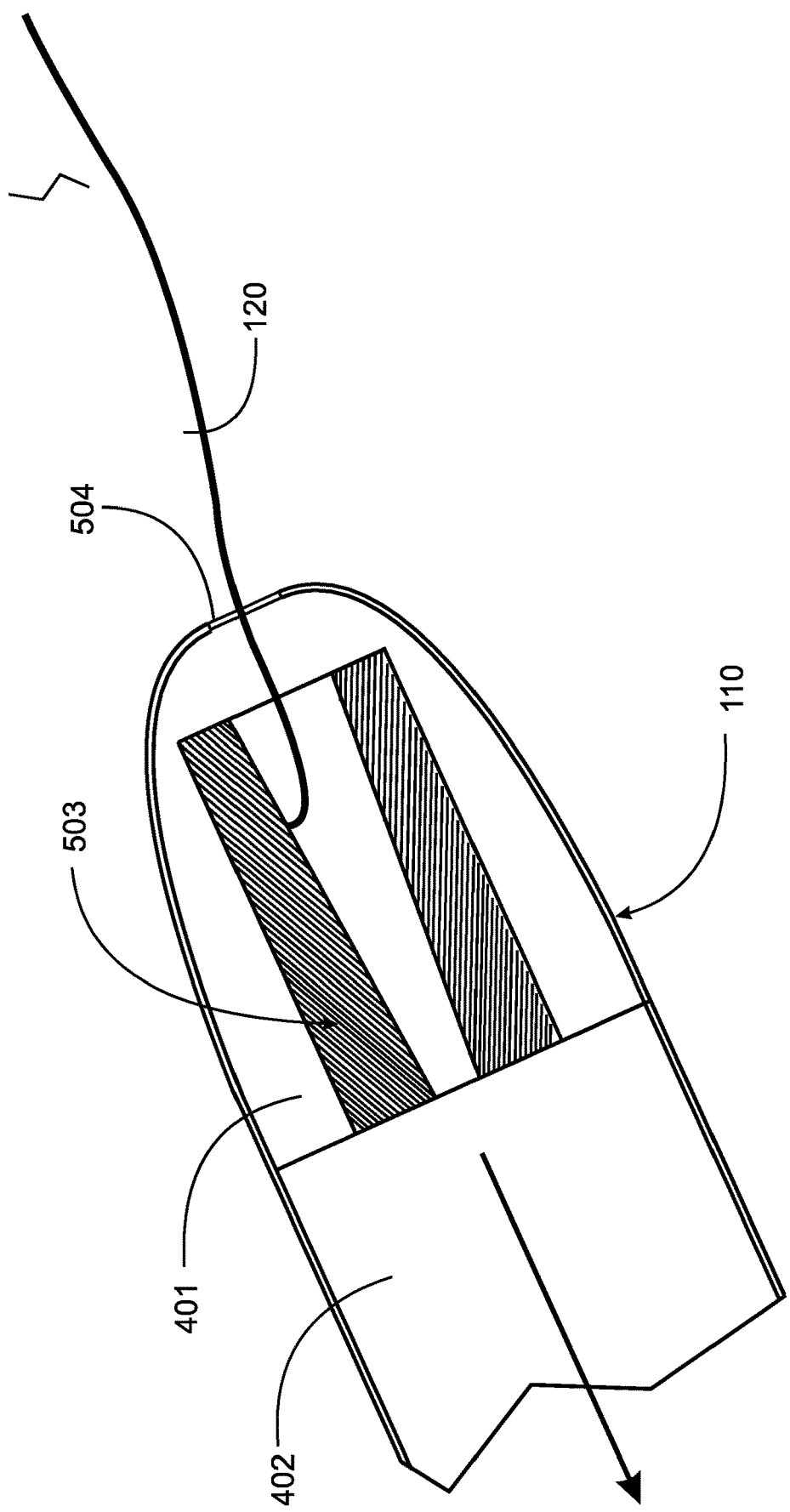
FIG. 5C illustrates the bobbin of FIG. 5B feeding tether line from a pod in an embodiment of the invention.
Figure 5D:
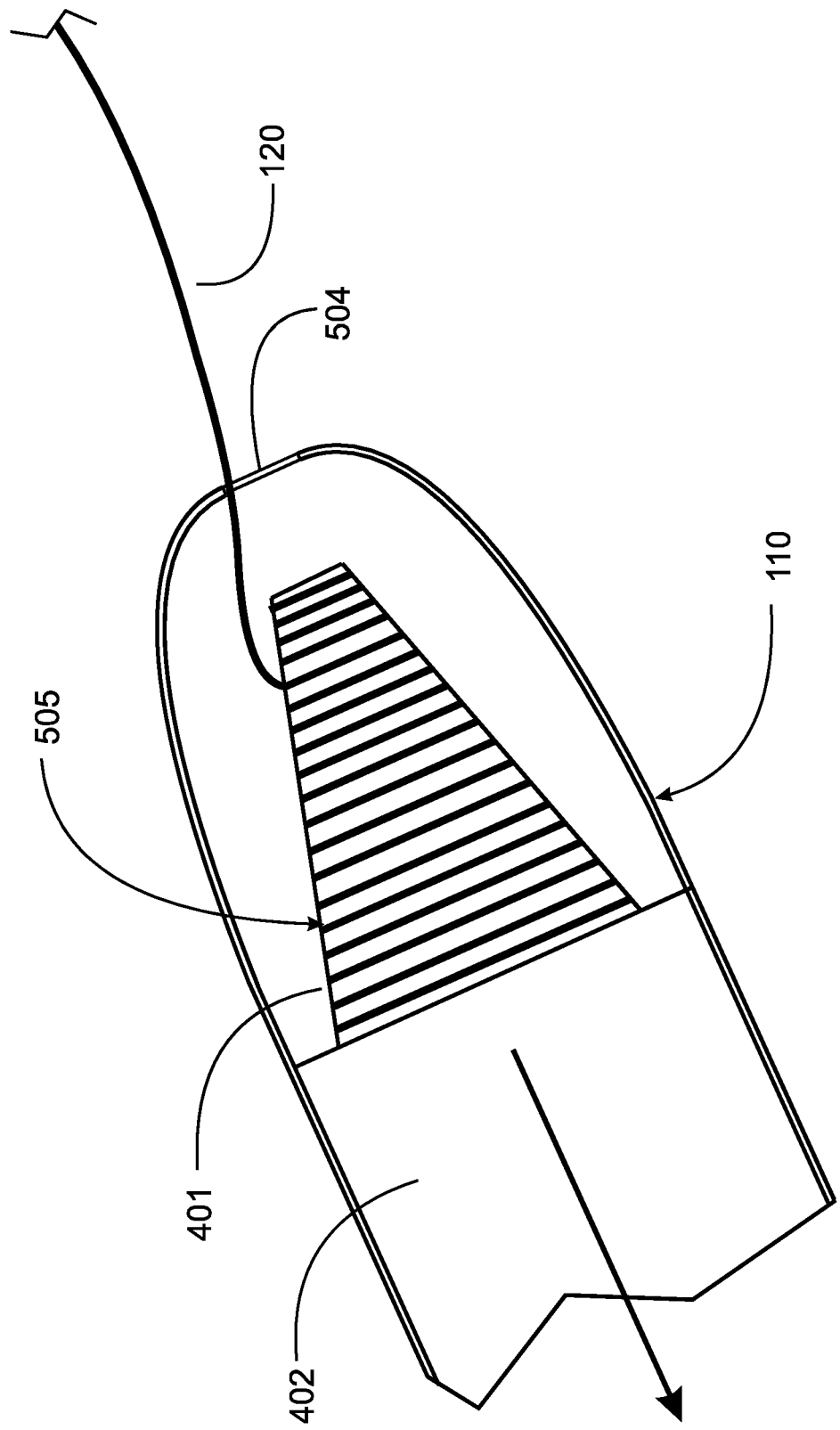
FIG. 5D illustrates another embodiment of a bobbin feeding tether line from a pod.

FIG. 5C is an illustration of bobbin 503 removed from core 502 and placed in section 401 of pod 110, and is presented in cross-section to illustrate some important features. Tether line 120 unwinds from the inside of bobbin 503, through a smooth metal ring 504 in this example. This arrangement the inventors have found to present the least friction, essentially none. It is important that the feeding out of tether line from the bobbin does not assert any force on pod 110 as it descends, which would tend to alter the path of descent.

Figure 6:
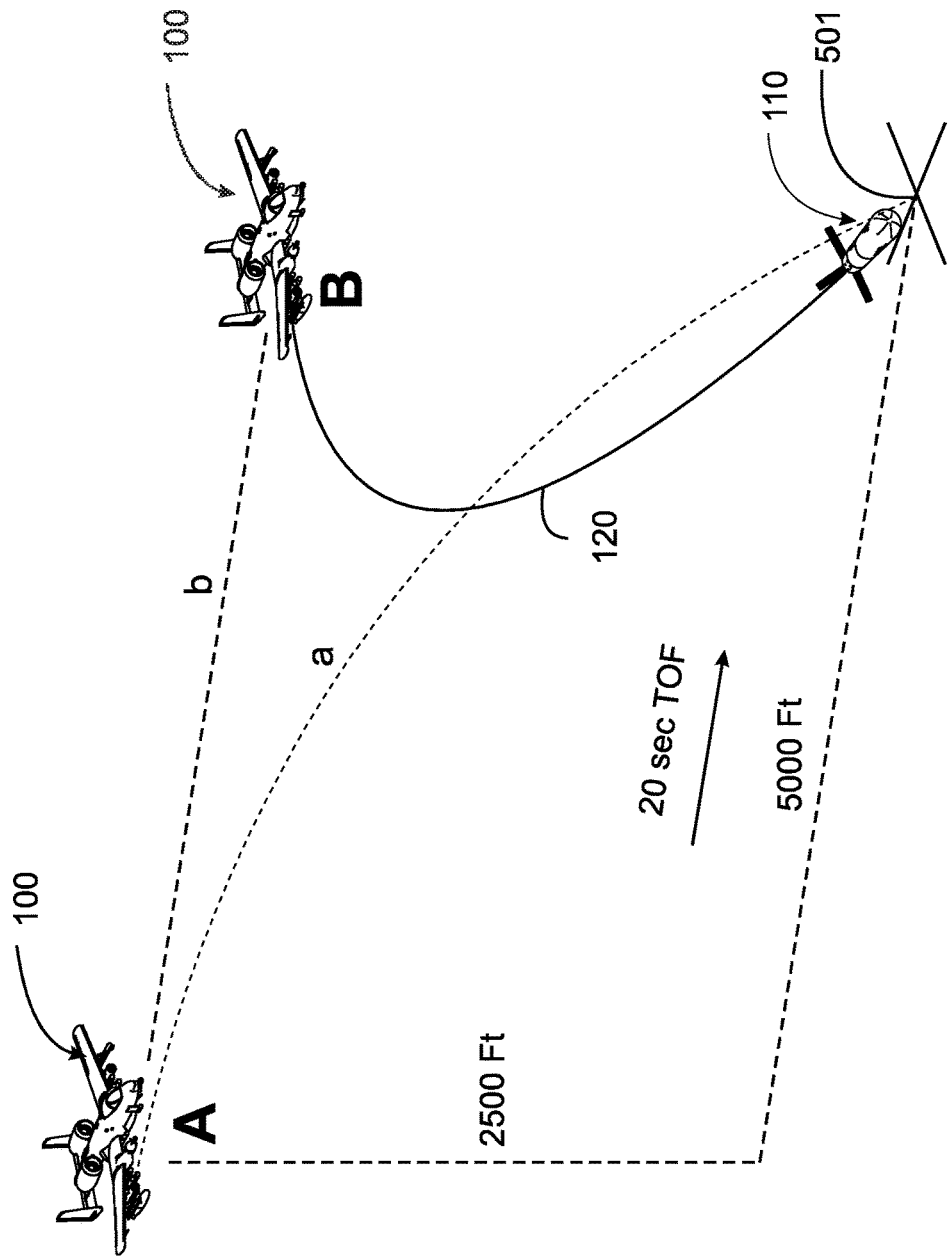
FIG. 6 is an exemplary diagram showing detail of dropping a pod to a location in an embodiment of the present invention.

FIG. 6 is an illustration of the overall process of releasing and dropping pod 110 by aircraft 100 to a predetermined point 501 on ground surface. FIG. 3 illustrated a momentary point in this process. In the particular example of FIG. 6 aircraft 100 has released pod 110 at point A at an altitude of 2500 ft., and at a distance of 5000 ft. from desired point 501. By predetermined point is meant a point whose coordinates have been transmitted to aircraft 100, to a software system operating in concert with touchscreen controls 200 as seen in FIG. 2. An individual to be the subject of extraction has transmitted the coordinates with aid of a GPS system as a part of equipment that the individual has on his or her person.

The pilot of aircraft 100 has entered the coordinates into the Rapid Aerial Extraction System (RAES) system on board, which returns to the pilot necessary data for performing the extraction. For example, various real-time data is employed by the RAES software system, such as wind conditions, model and weight of pod 110, and model and capabilities of aircraft 100, among possibly other data. In this particular example, the RAES system has determined that the release is to be at 2500 ft. and at 5000 ft. from the end point. The skilled person will understand that these numbers may vary considerably based on a number of factors.

In FIG. 6 trajectory "a" is the path of pod 110 in free fall. Path "b" is the straight line path of aircraft 100 after releasing the pod. The time of flight (TOF) is calculated to be twenty seconds in this particular example, and aircraft 100 is calculated to be directly over point 501 at 2500 ft. altitude as pod 110 approaches ground point 501. At twenty seconds after release aircraft 100 performs a climbing turn into a circular orbit at a somewhat higher altitude. The exact specifics of the change in course and altitude has been determined by the RAES system based upon all the predetermined and real-time data available.

Figure 7:
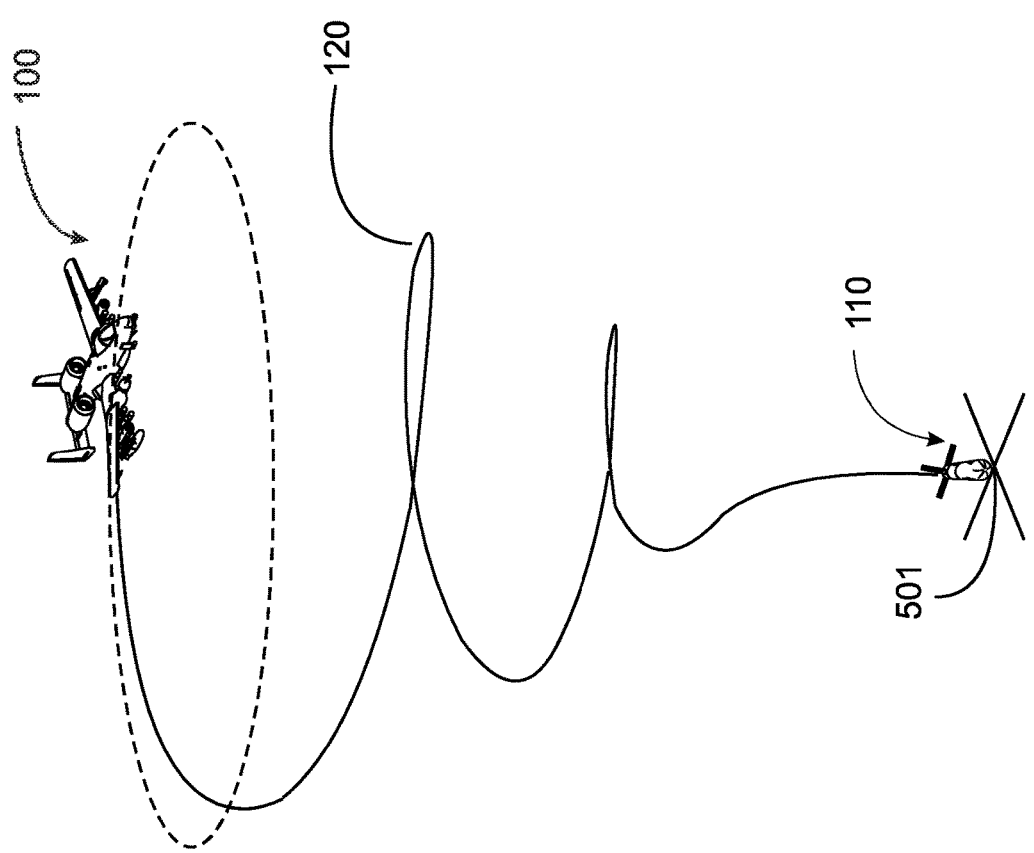
FIG. 7 is an illustration of a pod at a point at ground level and a tether in a spiral to a fixed-wing aircraft in orbit over the point of the pod.

FIG. 7 illustrates a result of the climbing turn, and the attainment of a circular orbit, indicated by dotted line, at a specific altitude according to all of the data available in the method and system described. The result is termed a gravity well, in which tether 120 assumes a spiral pattern terminating at pod 110 at one end and at the anchor point on aircraft 100, in this case under the wing where the pod was carried. The geometry of the spiral is a result of the velocity of aircraft 100, the diameter of the circular orbit, the altitude of aircraft 100, and the weight of pod 110, among possibly other data points. Tension in tether 120 at the connection to pod 110 is vertical, and just sufficient to support pod 110 without movement.

In one embodiment there may be sensors in pod 110 that transmit to the RAES system in aircraft 100 such things as tension in tether 120, height of pod 110 above the surface, relative sideways movement, and so on. Minor adjustments in altitude of aircraft 100, velocity, turn radius, and the like may be calculated and accomplished to place pod 110 stationary at point 501, and to maintain that position while aircraft 100 continues in a circular orbit.

Figure 8:
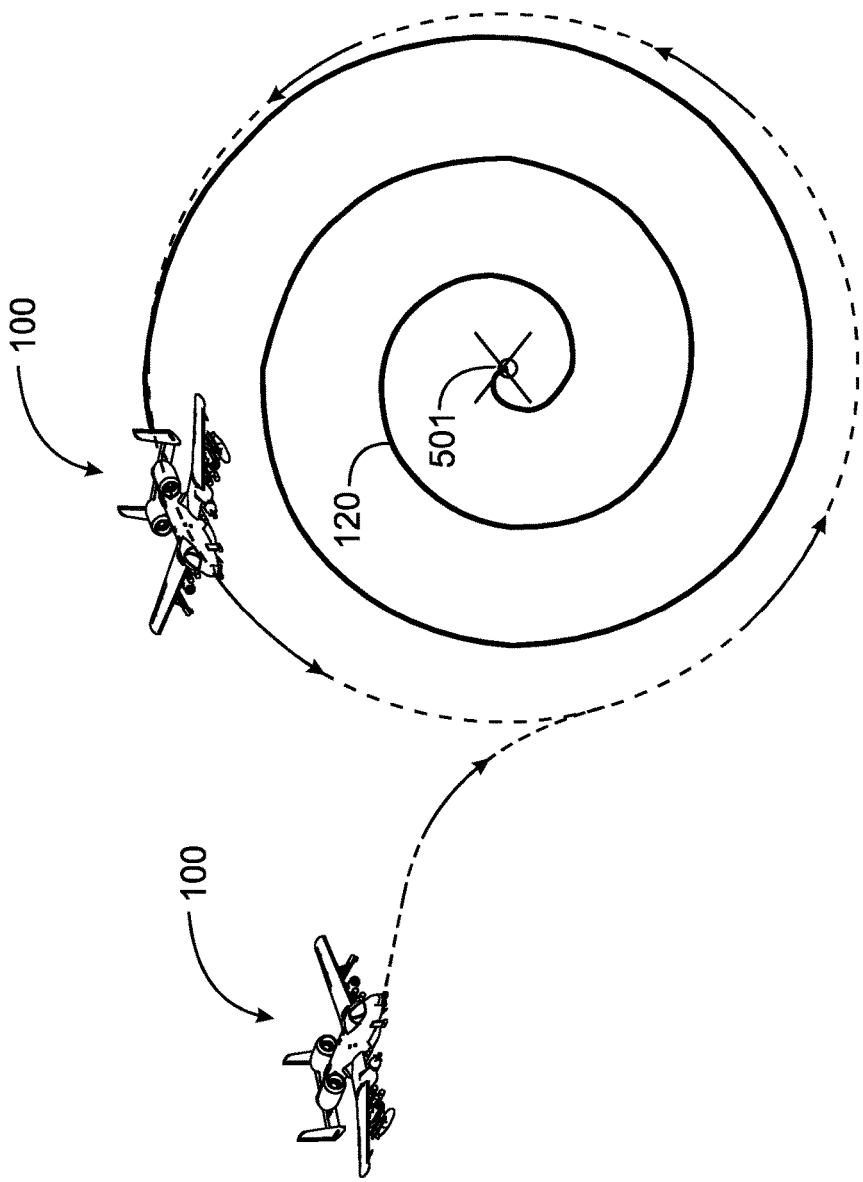
FIG. 8 is a plan view of an aircraft in circular orbit and a tether in a gravity well configuration to a pod at ground level.

FIG. 8 is a plan view from above the circular orbit of aircraft 100 illustrating an example of entry of the aircraft into the orbit, and the spiral of tether 120 that results. Delivery of the pod is not necessarily automatic. It is not intended that the pod strike the ground as would a bomb of the same size and weight. To do so might well destroy the pod and the elements inside. Rather, the speed of the aircraft, the altitude, and the entry into the spiral are calculated and performed to bring the pod rather gently to ground point 501. To accomplish this feat it is necessary that critical maneuvers of the aircraft be performed while (during a specific time window) the pod is in free fall toward point 501. The aircraft establishes the circular orbit and the tether is the resulting spiral before the pod is lowered to the ground, which may be done by a gradual lowering of the altitude of the aircraft in its orbit.

Once pod 110 is at point 501 the individual to be extracted is responsible to open the pod, which may be done in certain embodiments by releasing panels in an outer shell. This provides access to the extraction and parachute harness inside section 403 (see FIG. 4). The individual may attach the harness to tether 120 and subsequently release remnants of pod 110 from the tether. After freeing the harness and attaching same to the tether, the individual must don the harness, and in some cases other gear, prior to the extraction.

Figure 9:
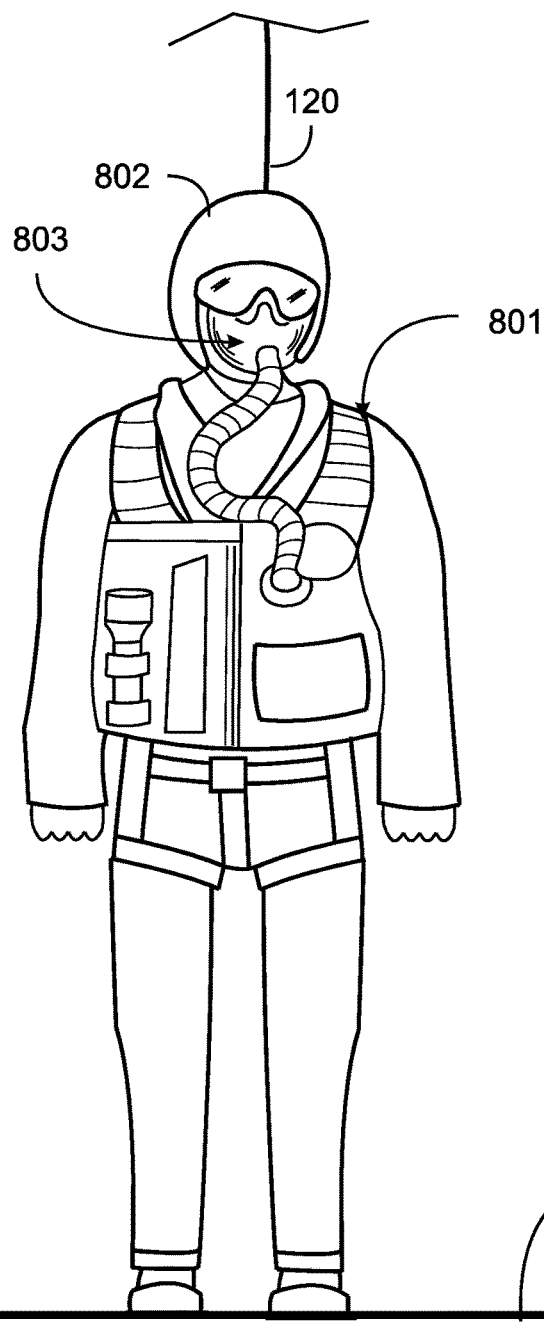
FIG. 9 is a view of an individual having donned a rescue vest prior to extraction by tether to a fixed-wing aircraft in an embodiment of the invention.

FIG. 9 illustrates an individual having donned a harness 801, and additional elements, such as a helmet 802 and an oxygen mask 803. Tether 120 is seen extending above the individual in the harness, and is attached at the back of the harness, not seen in FIG. 9. At this point in time it is assumed that the individual is ready to be extracted, and the harness apparatus has, as indicated above, radio circuitry by which the aircraft may be contacted.

Figure 10A:
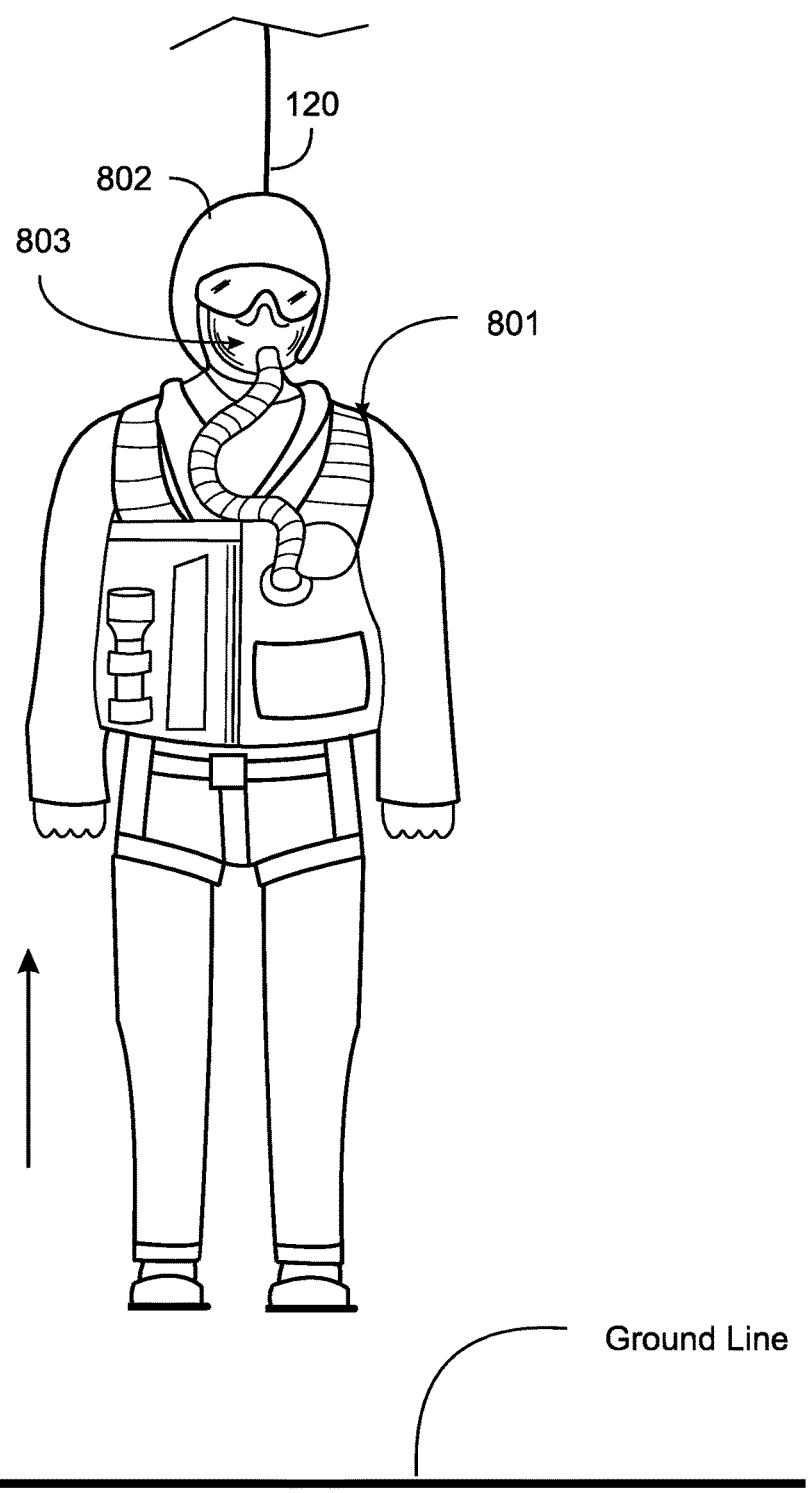
FIG. 10A is an exemplary view of the individual of FIG. 9 in process of extraction by the fixed-wing aircraft in an embodiment of the invention.

FIG. 10A illustrates the individual in harness from FIG. 9, beginning the extraction journey. To accomplish the lift the circling aircraft may gradually begin to gain altitude in the circular orbit, or may simply extend the diameter of the orbit at a controlled rate, either of which will gradually increase tension in tether 102 to a point that an upward force equal to the weight of the individual in the harness is counterbalanced. Further adjustment will lift the individual in the harness from the ground as shown in FIG. 10A.

Figure 10B:
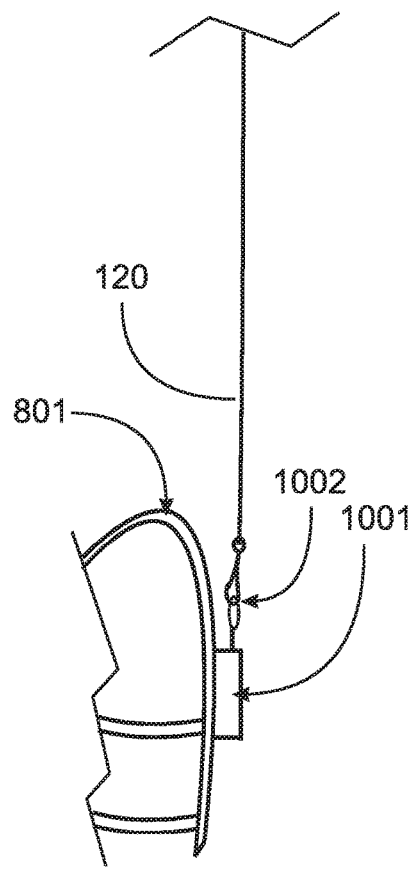
FIG. 10B is illustrates the attachment location of the tether and tension sensor to the harness.

FIG. 10B is a side view of just a back portion of the harness 801 worn by the subject in FIG. 10A, illustrating a tension sensor 1001 Firmly fastened to the back of the harness. Tension sensor 1001 is coupled to tether 120 by a clip connector 1002, which the subject may connect in the process of donning the harness.

Tension sensor 1001 is capable of sensing tension in tether 120 from no tensions to 300 pounds or more, and also is capable of reporting the readings through wireless communication circuitry to either of both of radio equipment integrated with harness 801, or in some embodiments to a nearby UAV or back to the fixed wing aircraft, as an aid in control in the extraction process.

A very important advantage of the unique manner the individual is lifted off the ground is the gentle force which enables the individual to not experience injuries during the lift. Prior to applicant's invention, these types of lifts from a fixed-wing aircraft would cause grave injuries because of the blunt force at lift-off caused by the speed of the aircraft not implementing applicant's system. Typically, with applicant's unique method and system of lifting the individual off the ground, as in FIG. 10, causes a lifting force at the harness of 1.1-1.4 g. In this manner, no injuries are experienced by the individual being lifted.

In another embodiment, the tension in tether 120 at or near harness 801 may be communicated to the aircraft as input to determine flight characteristics. Maneuvering the aircraft to control tension in tether 120 is seen as a good way to accomplish extraction while maintaining a safe range of G force. Specifically, the algorithm implemented wherein a height of the gravity well is a function of weight of the pod and tension of the tether as reflected by the tension sensor 1001.

Figure 11:
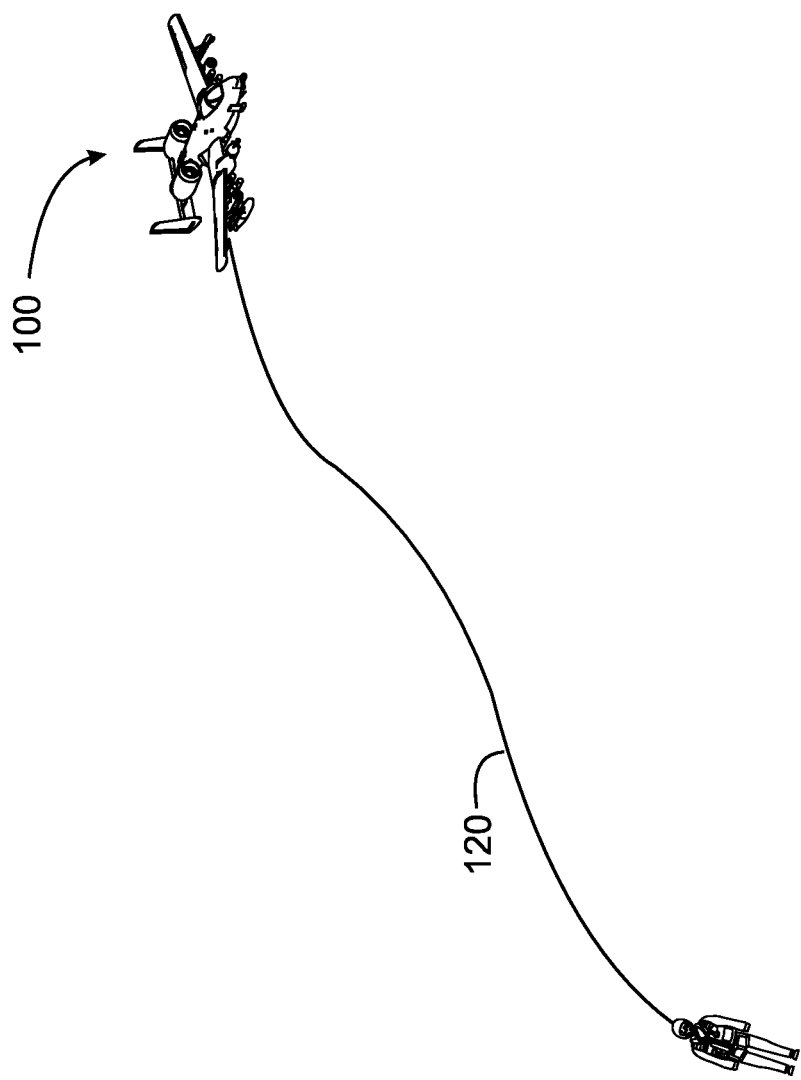
FIG. 11 illustrates the individual of FIG. 10 further transported away from the ground point.
Figure 12:
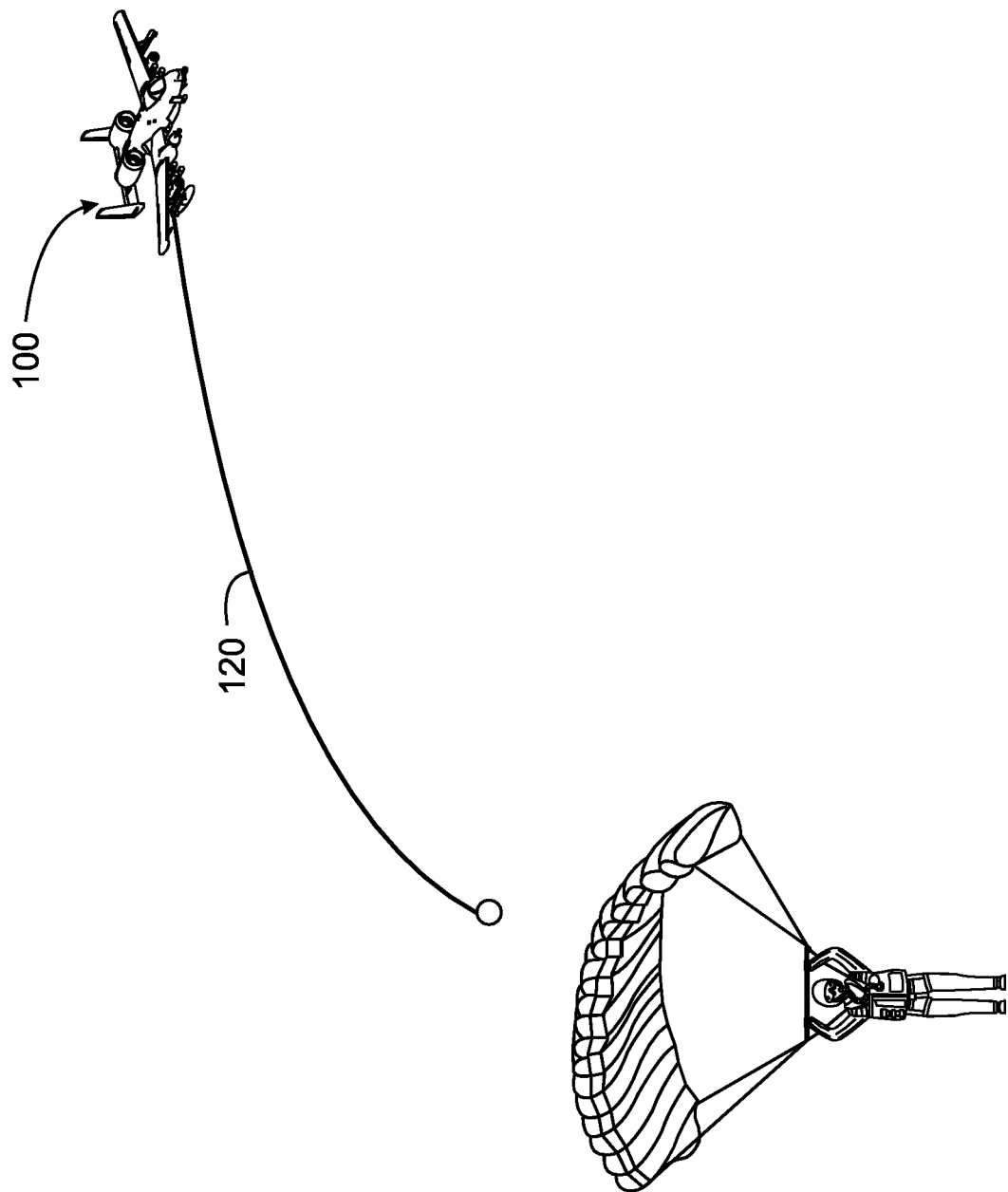
FIG. 12 illustrates the individual of FIG. 11 having released the tether and opened the parachute.

At some point the aircraft leaves the circular orbit in a roll-out maneuver preferably toward a heading to a safe drop zone for the individual being extracted. FIG. 11 is an illustrating of aircraft 100 having left the orbit, and the individual being extracted on tether 120. The roll-out has an effect of gradually raising the subject in the harness from the ground position. The tether has not, at this time, fully drawn out of the spiral of the gravity well. In FIG. 12 the aircraft and individual have reached a safe zone, and the individual has released the tether and has employed the parachute to descend to the ground in the safe zone. After this release the aircraft may release the tether from the anchor point on the aircraft as well, and the extraction is complete.

Figure 13:
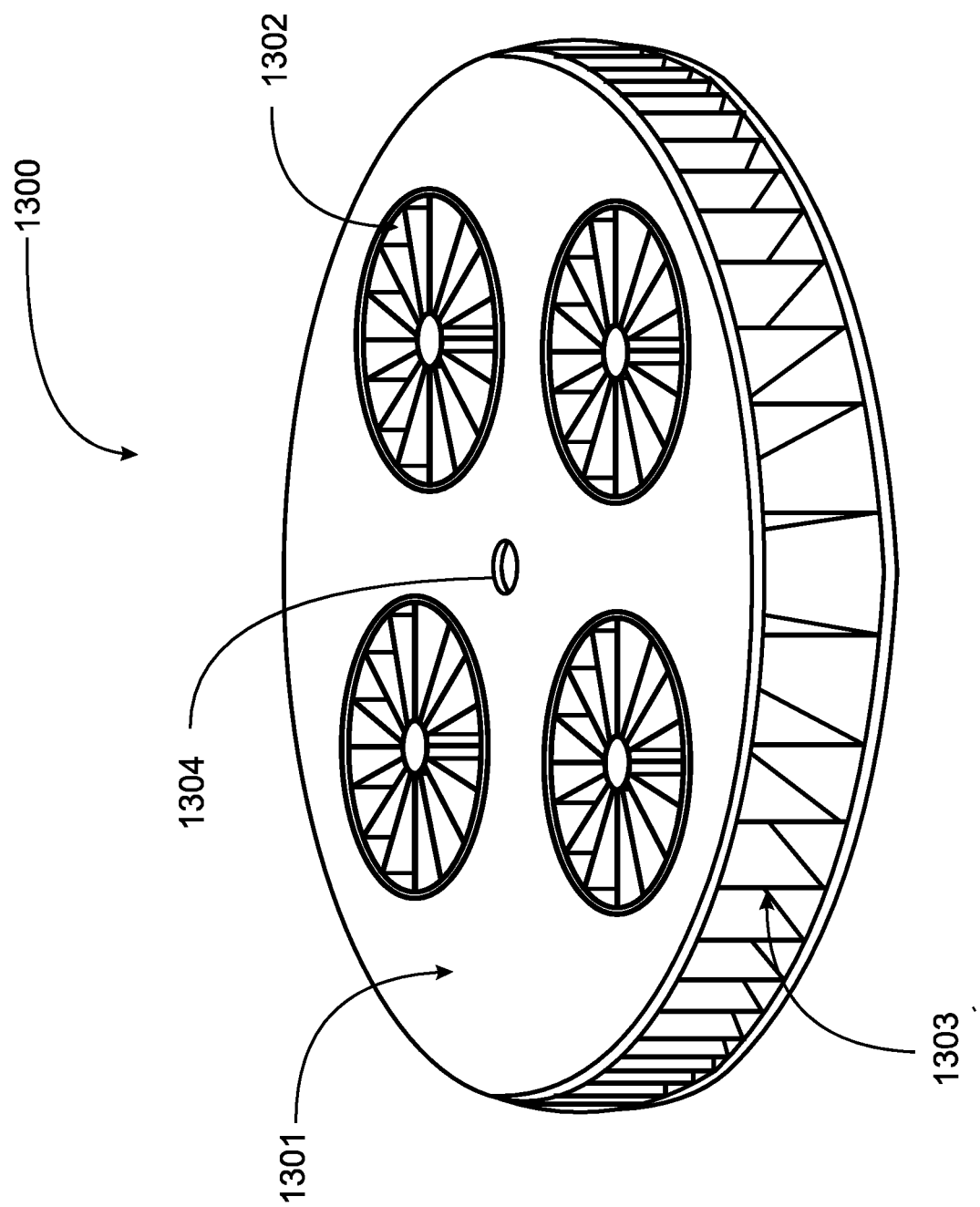
FIG. 13 is a perspective view of an example stabilizer apparatus for use in various embodiments of the invention.

FIG. 13 is a perspective view of a stabilizer apparatus 1300 for use in various embodiments of the invention. Apparatus 1300 is a relatively small unmanned aerial vehicle (UAV) that interfaces with the tether in embodiments of the invention through center opening 1304, which passes vertically through body 1301 of the UAV. There are, within the body described more fully below, drive elements that engage the tether, and enable the UAV to climb the tether or to descend on the tether. UAV 1300 has, in this example, four fans 1302 that are the drive elements that facilitate flight for the UAV, similar to other UAVs. There are further, in this example vanes 1303 that may direct air from fans laterally, and which may be managed to help maneuver the UAV. Variations may occur in number of fans, vanes and variations in direction of air flow of those fans without departing from the purpose and function of UAV 1300.

Figure 14:
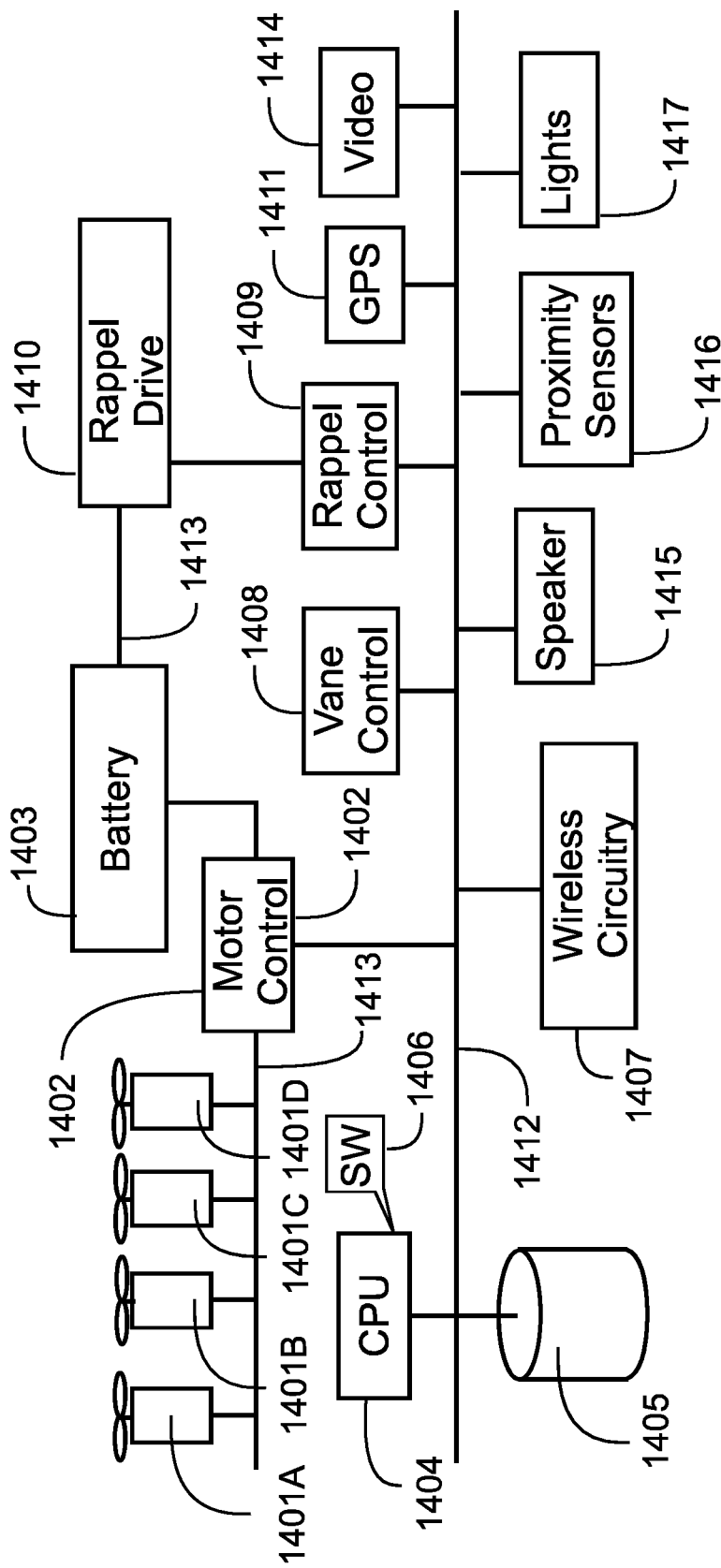
FIG. 14 is a diagram of elements internal to the stabilizer apparatus of FIG. 13 in one embodiment of the invention.

FIG. 14 is a diagram as an example of elements internal to UAV 1300 in one embodiment. DC motors 1401 A, B, C and D are coupled to fan blades for the fans 1302 of FIG. 13. The fans are powered in this example by a DC rechargeable battery 1403 though power lines 1413, with power controlled by motor control circuitry 1402 in a manner that the fans may be individually driven at different speeds in different directions if desired. This control feature enables the UAV to be flown in all degrees of freedom.

Wireless circuitry 1407 represents communication apparatus enabling UAV 1300 to communicate with the fixed-wing aircraft and the subject to be extracted, and further to download coded instructions from the fixed wing aircraft. SW and control functions are provided enabling a responsible person in the fixed-wing aircraft, or in some instances the subject to be extracted, to command functions in the UAV.

UAV 1300 comprises a speaker 1415 through which announcements, alerts and the like may be enunciated. Lights 1417 may be of several forms, and may be turned on and off automatically and manually. Proximity sensors 1416 provide positional information. Rappel drive 1410 enables the UAV to ascend or descend on the tether, and enables locking the UAV to the tether as well. Control in rappelling is through control 1409, which manages motors in rappel drive 1410. GPS 1411 provides geographic location needed in maneuvering and location. Video system 1414 has one or more video cameras which may be accessed by persons in the aircraft to aid in precise maneuvering of the UAV, and hence of the tether and payload that may be attached to the tether.

Motor control 1402 and all other functions of the UAV are managed by SW 1406 executing on CPU 1404 from data repository 1405. Electronic elements are interconnected by a digital bus 1412, which interconnects all digital circuitry.

UAV 1300 also comprises vane control circuitry 1408, managed by SW 1406, to control vanes 1303 and rappel control 1409 managed by SW 1406 to control rappel drive 1410 to enable the stabilizer apparatus to climb and descend on tether 120. There is additionally GPS circuitry 1411 in this example providing geographic location coordinated for the UAV. In some embodiments there may further be video cameras and camera controls for direction and focus, represented by element 1414, to aid in navigation of the UAV, and consequently of the pod.

Different embodiments of the UAV stabilizer may be accomplished in a variety of designs and with a variety of control and drive elements to accomplish the functionality needed in the invention. The specific elements and interactions described here are entirely exemplary.

The skilled person may see from the diagrams in descriptions that UAV may be remotely controlled by systems in the fixed-wing aircraft in embodiments of the invention through SW executing in the aircraft and commands by responsible persons in the aircraft, through wireless communication radio circuitry. In some embodiments the UAV may be influenced by communication from the surface in equipment controlled by a person sought to be rescued. The UAV may also be programmed to home on signals from the pod dispatched to the point where a person is to be extracted.

Figure 15:
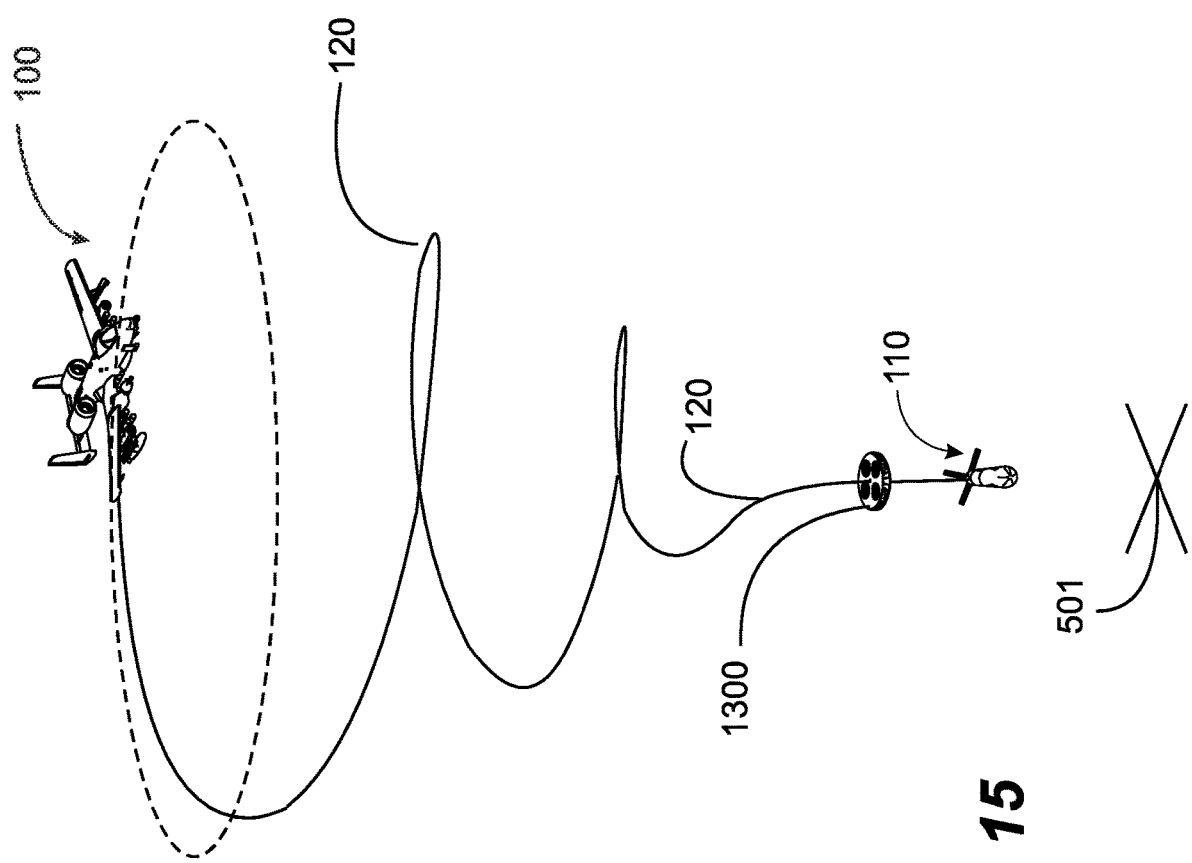
FIG. 15 illustrates delivery of a pod with aid of a UAV stabilizer in an embodiment of the invention

FIG. 15 illustrates a delivery for a pod 110 by a fixed wing aircraft 100 and tether 120 in a gravity well, wherein the aircraft circles at a specific speed at a specific radius over a delivery point 501, and lowers the pod to the surface. In this example a UAV stabilizer 1300, as described above, is interfaced with tether 1300 at a point on the tether a relatively short distance above pod 110. A pilot or other responsible person in the aircraft may command the UAV remotely in a process of bringing the pod to the desired point. The UAV may intercept signals from the pod as well. The pilot may also utilize the video cameras in the process.

The addition of the maneuverable stabilizer UAV is in some case to provide very precise delivery in situations where a person can be evacuated, or where material may be desired to retrieve, in such as urban settings, where the system may need to lower a pod on a tether between buildings or other structures, and precise maneuverability may be needed. The same may be true in extractions or retrieval in situations where the person to be retrieved or the material is in a lake or open sea situation.

In embodiments using stabilizers 1300, tether feed from a bobbin may in some cases be appropriate, but in some other cases feeding the tether from a winch (described below) in or on the aircraft may be appropriate.

It should be noted that the UAV 1300 is enabled to climb and descend on the tether by virtue of rappelling elements interfaces with the tether. In some circumstances it may be desirable to position the UAV very close to the pod, so the pod may be moved laterally almost directly, and in some instances the UAV may be more advantageously positioned at a further distance above the pod. In many case, the UAV may be utilized while the pod is above the surface, and lateral positioning is accomplished by maneuvering the UAV, and then the pod may be lowered by lowering the UAV, or feeding tether from the UAV via the rappelling elements to lower the pod.

Once the pod is delivered to the desired position, and the person, equipment or material is ready to fly, the pod, in most cases has not sufficient lifting power to lift the person, material and/or equipment from the surface. In this instance, the UAV may certainly provide some extra lifting power to the tether, and may keep the person, material and/or equipment ascending in a safe and straight path. In an urban extraction, for example, perhaps between buildings, the maneuverability of the pod and the advantage of the video cameras and proximity sensors may be critical to success.

Figure 16:
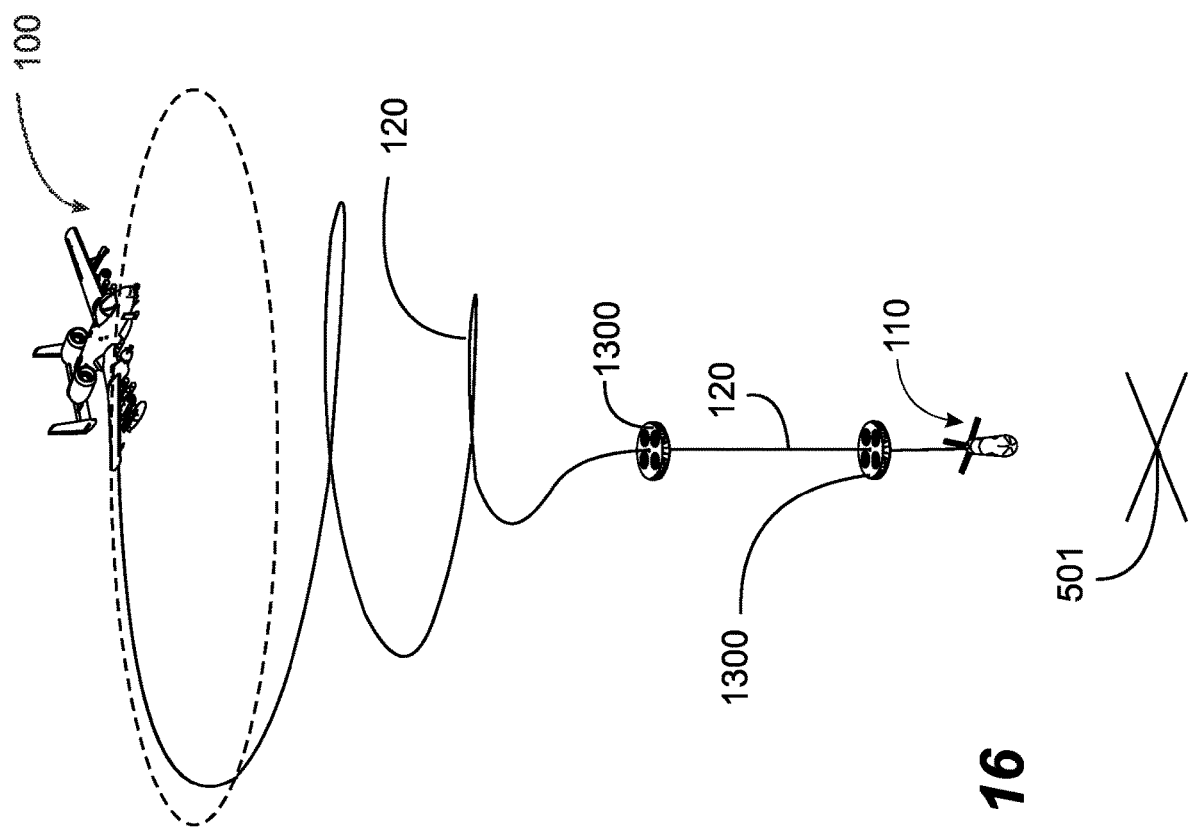
FIG. 16 illustrates delivery of a pod with aid of two UAV stabilizers in an embodiment of the invention.

FIG. 16 illustrates delivery of a pod with aid of two UAV stabilizers in an embodiment of the invention. In the situation depicted by FIG. 16 one UAV stabilizer 1300 is positioned on tether 120 just above pod 110, and another UV 1300 is used at an altitude substantially higher. The UAVs, of course, may be maneuvered independently, with the upper providing course positioning while the lower provides more precise positioning. The two together may also provide additional lift in the extraction process.

Operation with one or two UAVs will typically comprise delivering the pod first to a course location at an altitude above the desired delivery point. The UAVs then are used and piloted remotely to position the pod precisely. Then the pod is lowered to the delivery point, which may be done by altitude adjustment of the aircraft, and may be aided by maneuvering the UAVs.

In the extraction process UAVs may be used, especially in critical situations, to help fly the extraction package to a safe altitude away from any buildings or other structures, and then may be powered down and may be locked to the tether by the rappelling elements. The UAVs may also be descended on the tether to be close to the extraction package so they do not cause unnecessary forces on the tether. The extraction proceeds much as described above for the case where there are no UAVs, with the aircraft ascending and pulling out of the circular orbit. In many embodiments tension in the tether is monitored by one or more sensors, particularly at the interface to the extraction package, such as the harness donned by a person to be extracted. The process is one of gradually increasing the tension in the tether until the weight of the extraction package is overcome, and then further increasing the tension to lift the package from the surface, and to gradually accelerate the package upward and then away toward a safe drop zone.

In an alternative embodiment of the invention extraction is practiced from a larger, transport-type fixed-wing aircraft, using a winch through a cargo door, and the extracted subject may be retrieved from an extraction point into the aircraft, rather than parachuting to a safe zone as described in other embodiments above, which may be practiced from an attack aircraft, such as an A-10.

Figure 17:
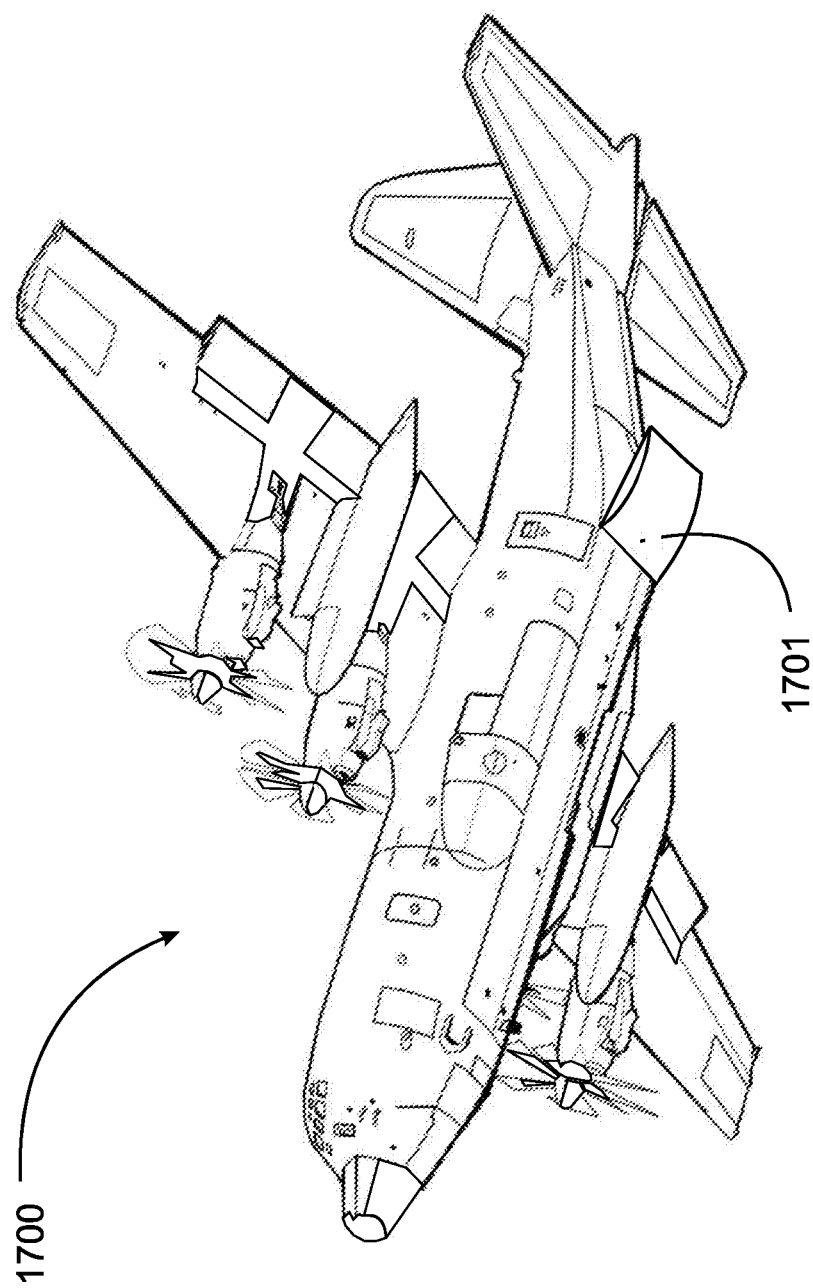
FIG. 17 is a perspective view of a transport aircraft of a sort that may be used in winch-enabled embodiments of the invention.

FIG. 17 is a perspective view of a transport aircraft 1700 of a sort that may be used in winch-enabled embodiments. Aircraft 1700 in this figure is a C-130 model transport aircraft, but many transport-type aircraft may be used. Requirements are a cargo bay large enough to accommodate equipment to be described below, and a cargo door 1701, preferably facing to the rear as in this example, that may be used for deployment and retrieval.

Figure 18:
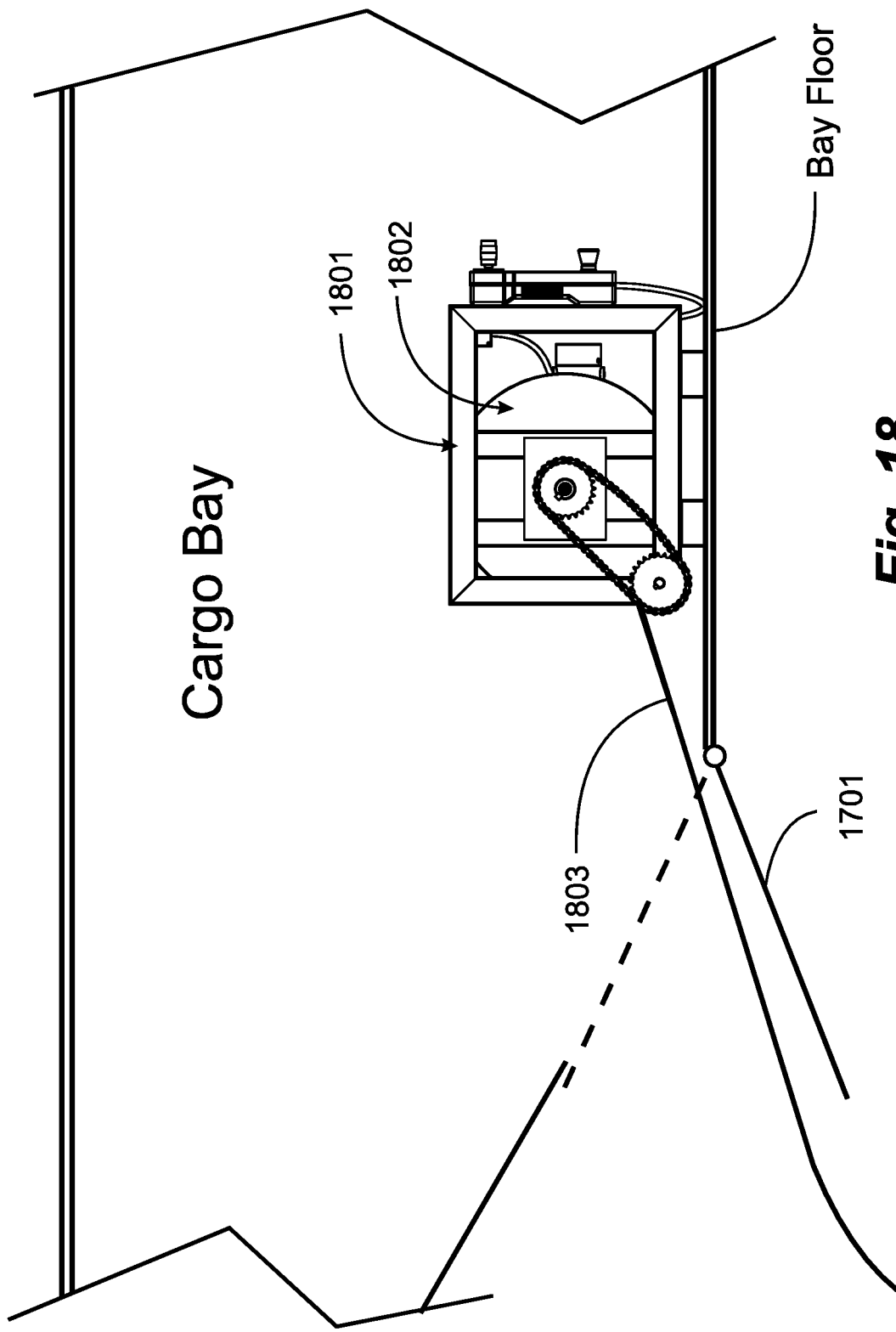
FIG. 18 is a cut-away view of a winch apparatus 1801 having a drum 1802 in an embodiment of the invention.

FIG. 18 is a cut-away view of a winch apparatus 1801 having a drum 1802 in an embodiment of the invention, the winch deployed in a cargo bay of aircraft 1700, near cargo door 1701, to feed and retrieve tether line 1803 in a rescue operation. Winch 1801 may be mounted to a bay floor of the aircraft 1700 in this embodiment. Drum 1802 is of a length and diameter that several thousand feet of tether line 1803 may be wound on the drum, deployed out door 1701, and later retrieved and wound back on to drum 1802.

Figure 19:
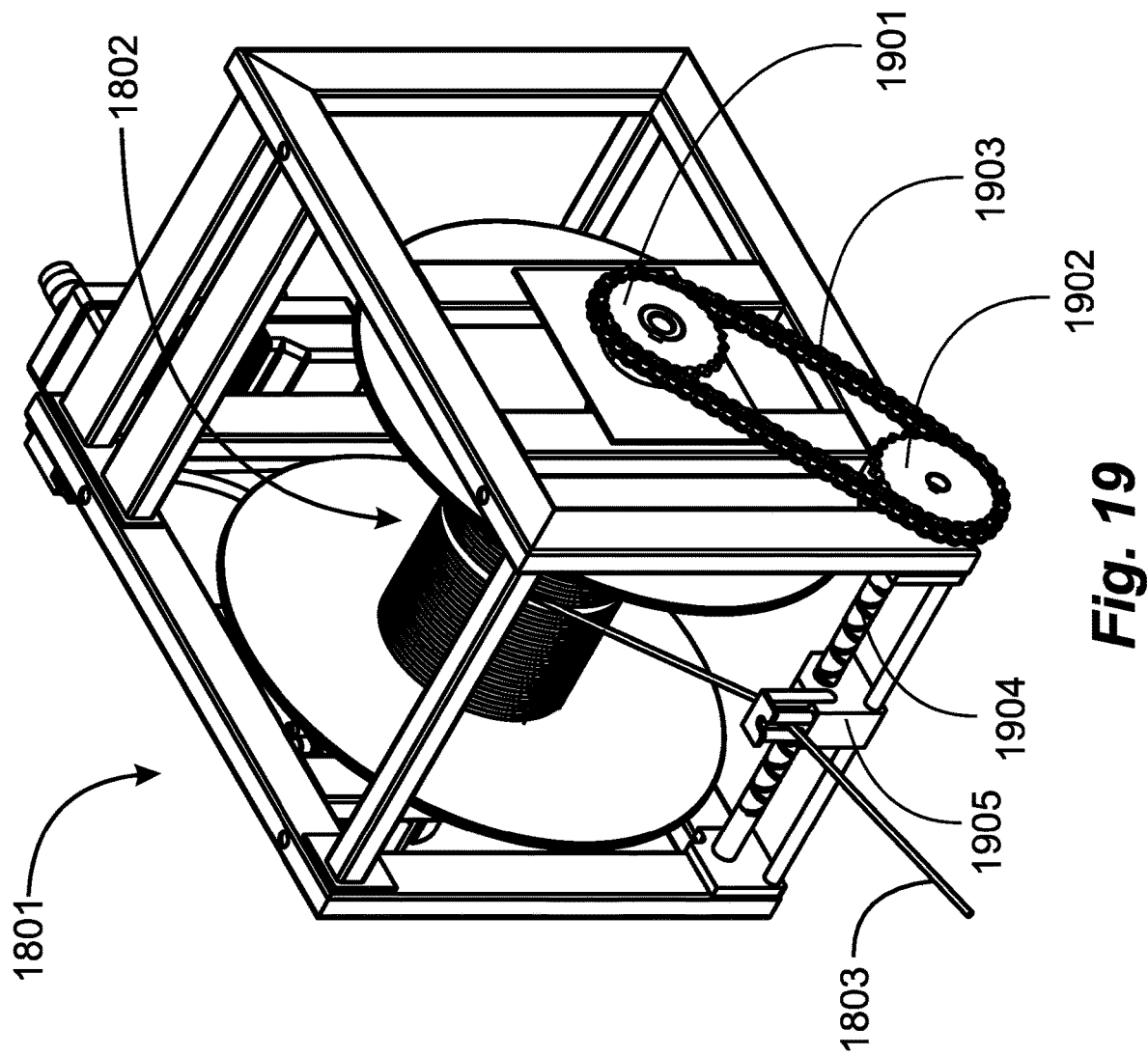
FIG. 19 is a perspective view of a winch from an angle in front to one side of the winch.

FIG. 19 is a perspective view of winch 1801 from an angle in front to one side of the winch. Drum 1802 operates on a shaft that has a chain sprocket 1901 engaged by a chain 1903 with a sprocket 1902 on a shaft at lower front of the winch. The lower shaft drives a cam shaft 1904 with grooves that are followed by a guide block 1905. The geometry is such that guide block 1905 traverses left to right and right to left in the direction of the axis of drum 1802, in a manner that guides the feeding or winding of drum 1802 to keep tether line 1803 evenly wound on the drum, regardless of whether feeding tether line or retrieving it.

Figure 20:
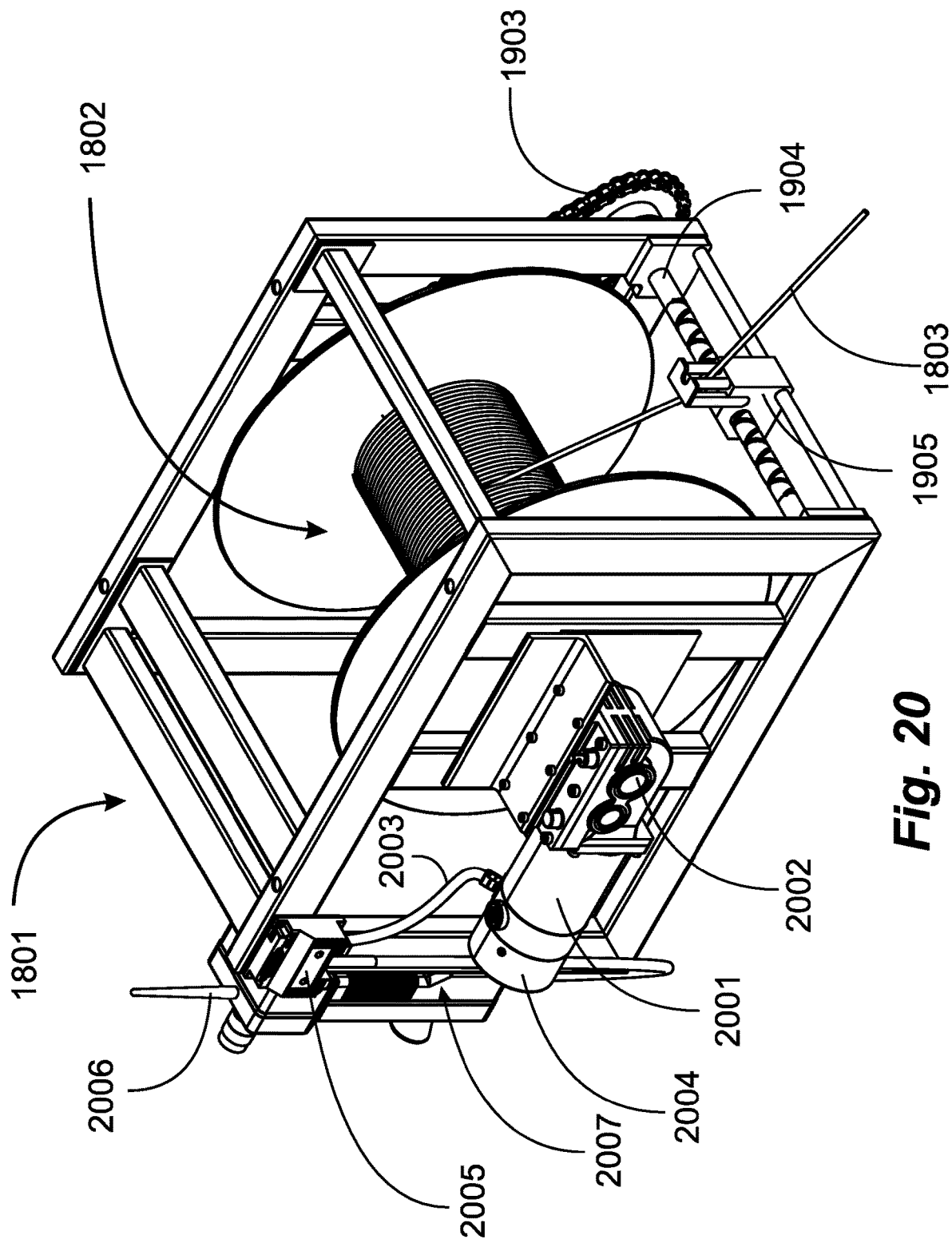
FIG. 20 is a perspective view of a winch from a viewpoint in the front to the opposite side of that of FIG. 19.

FIG. 20 is a perspective view of winch 1801 from a viewpoint in the front to the opposite side of that of FIG. 19. This view shows elements on the side opposite chain 1903 that are not visible in FIG. 19. Drive motor 2001 is shown engaged to a gear box 2002 with sufficient mechanical reduction to drive drum 1802 with sufficient power at and at rpm appropriate to use in rescue operations. Motor 2001 is powered through cable 2003 from a power supply 2005. Motor 2001 comprises a brake 2004 that may be manually or automatically engaged in certain circumstances to slow the rpm of drum 1802. FIG. 20 further shows a computerized controller 2007, and an antenna 2006 by which the computerized controller may communicate with remote devices enabled to communicate with the controller. Further description of controller 2007 and interaction with other devices is provided in enabling detail below.

Figure 21:
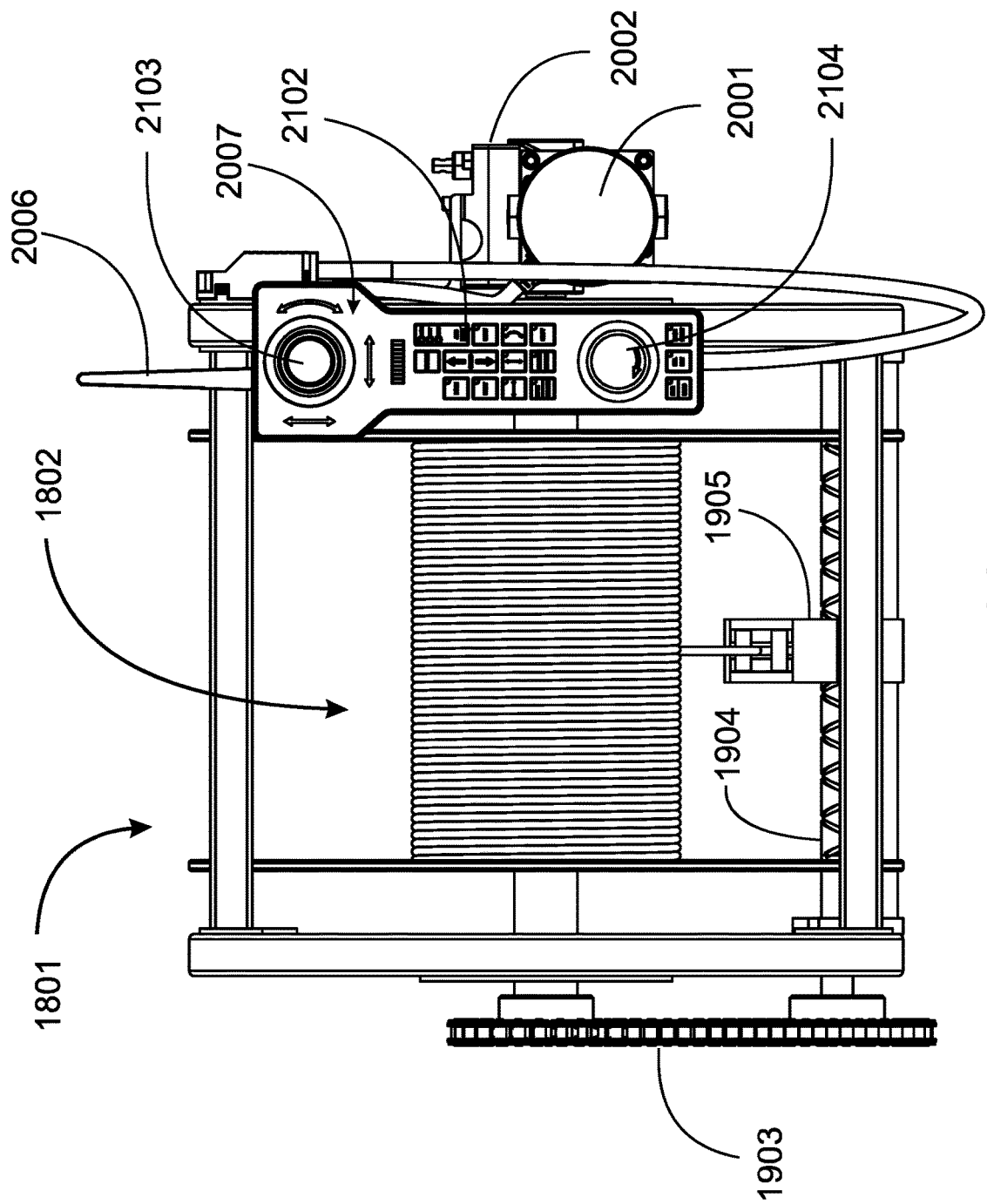
FIG. 21 is a back view of the winch additionally showing a panel on a controller by which the winch may in some circumstances be manually controlled.

FIG. 21 is a back view of winch 1801 additionally showing a panel 2102 on controller 2007 by which winch 1801 may in some circumstances be manually controlled. Panel 2102 comprises a series of buttons and switches are is provided to enable an operator to manually operate the winch control to run functions of the winch. Knob 2103 controls forward-reverse and speed for the winch. In an automatic mode winch 1801 is radio-controlled in a feed-back process detailed more fully below. The buttons and switches on the manual-control panel have lights that activate when activated and knob 2103 at the top moves with a servo inside the controller so that if the winch is under remote control the operator standing next to the winch can see things moving and buttons lighting up as if actuated by themselves. This provides the operator situational awareness.

Figure 22:
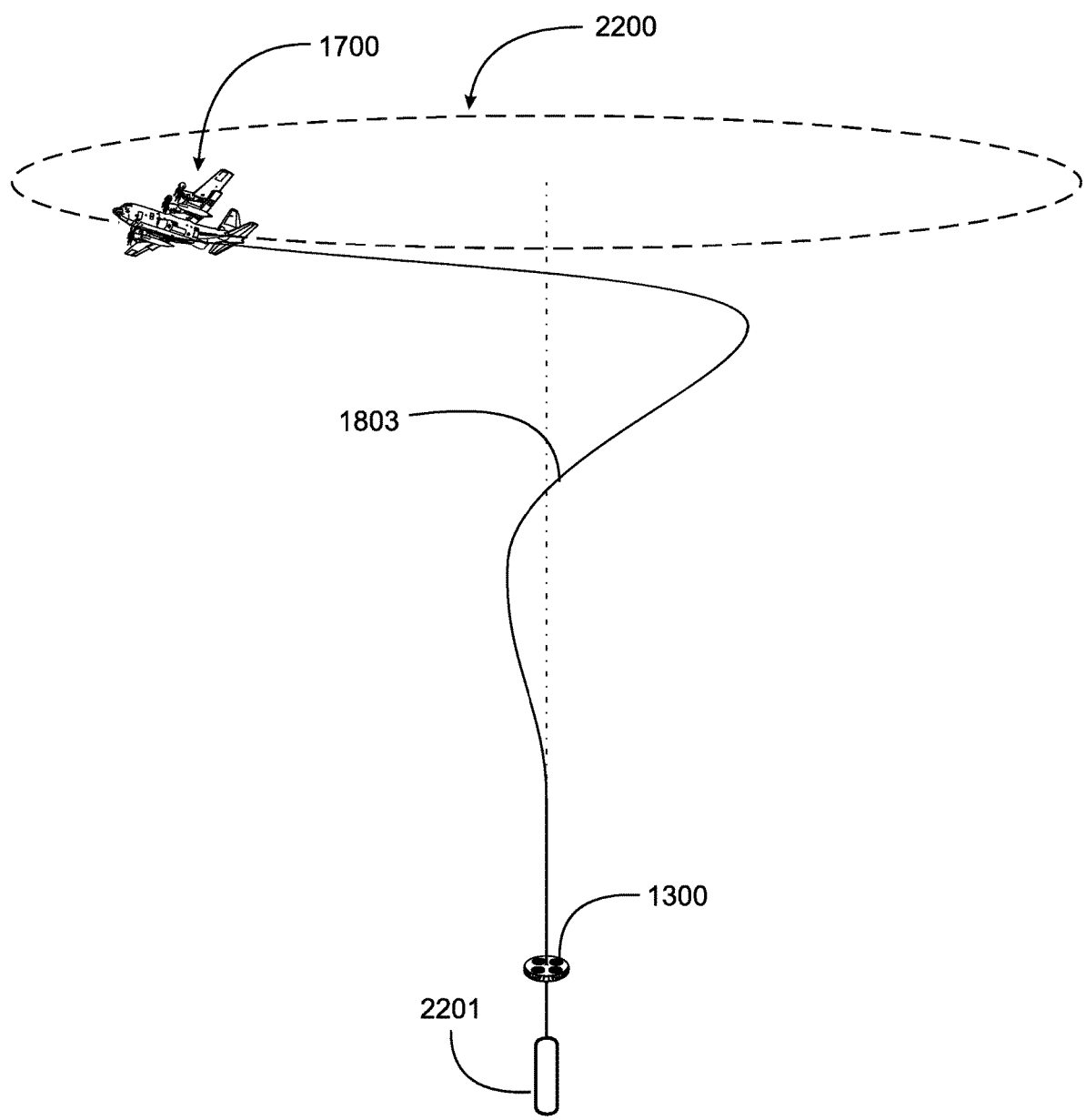
FIG. 22 illustrates a transport aircraft in a predetermined circular orbit with a tether line having been deployed from a winch in the cargo bay of the aircraft in an embodiment of the invention.

FIG. 22 illustrates a transport aircraft 1700 in a predetermined circular orbit 2200 with a tether line 1803 having been deployed from a winch in the cargo bay of the aircraft. The aircraft has adopted a flight path into the circular orbit while the tether line has been fed by the winch, such that a payload shown here as element 2201 is suspended in a gravity well, just as described above, with tether 1803 describing a spiral path.

Payload 2201 in one embodiment may be a harness, sans parachute, for a subject to don to be extracted and retrieved into the cargo bay of aircraft 1700. The harness may be provided in a pod that also may include GPS circuitry and radio circuitry that may be in continuing communication with computerized systems in aircraft 1700, which are in continuing communication with winch 1801, to coordinate operations of the winch and the aircraft to place the payload or pod with harness at a desired point. The delivery point may in some instances be provided to the aircraft systems by the subject on the ground to be extracted, if the subject has the knowledge and equipment to make the communication.

Alternatively the subject may be spotted by an alternative overhead asset that has a better look at the specific point of interest either by virtue of more capable optics such as would be found in a surveillance platform. This might be remotely controlled on a separate aircraft, such as an unmanned UAV, or a camera or on-board the winch platform. Such a system will survey the area and when it finds the point of interest it transfers an image of that spot to a stabilizer 1300 engaged on the tether, or en route to the target or hovering nearby.

In some cases machine vision may be used. Deployed stabilizers 1303 may be guided by manual positioning or automatically by a homing system. The pod, if used, may be homed using GPS coordinates, Inertial coordinates, laser designation such as used on smart bombs, infrared homing or machine vision homing. In machine-vision homing, there is a camera on-board one of the stabilizers, if more than one are deployed, that looks for a specific image that can be preloaded into the device or transmitted to the camera via another camera in real time.

The image used at the stabilizer may be provided from another source, as described above, that has a better vantage and superior imaging equipment. The better optics system would survey the area and when it finds the point of interest it transfers an image of that point to the stabilizer either en route to the target or hovering nearby.

The process described parallels hand-off of imagery much the same way a radar missile gets a hand-off from the on-board radar of a fighter. The first camera, being of higher resolution, on a stabilized gimbal or having the benefit of human interaction to find a target can take a still picture, send that still to the stabilizer who then uses its on-board pattern matching software to find and then execute an engagement.

As has been noted thus far, all separate assets in the system are in constant communication. The stabilizers deployed, whether engaged to tether line 1803 or not, are in contact with the equipment at the subject, and the computerized system in the transport aircraft, which systems are in constant communication with the winch in the aircraft. Every piece knows what the other pieces are doing, and there is capability of human intervention and fine-tuning to perfect the deployment and the extraction process.

On the ground or at another location there may a controller identical to that on the winch that operates the winch from the ground. The only way one knows who is in control is by a light in a pendant that will be green if that controller is active and red if it's not active. This is the only indication on either controller (or more than two) that the controller is either passive or active.

As an example, if the person on the ground is operating the winch the controller on the winch indicates a red light but all the other functions are mimicked by the controller. If the ground operator wants to let the tether out the big knob moves downward on every controller connected to the network. A typical operation would have the airborne operator lower the tether until a handoff is initiated and the ground operator assumes control. All the buttons and levers may be preset by the airborne operator so that when the ground controller takes over there are no sudden changes in operation of the winch.

For automatic operation, the stabilizer(s) will communicate with the same controller to operate the winch via radio link. If the stabilizer demands more tether it will signal the winch and more tether will be deployed. The winch is powered by a motor through a transmission that can be declutched. There is also a brake on the motor, as seen in FIG. 20, to prevent the drum from slipping under heavy loads. This brake is automatically engaged whenever the controller demands zero speed. This is done with the motor power supply.

In some embodiments payload 2201 as seen in FIG. 22 may be a capsule that the subject may enter and close for transport to the aircraft. In other embodiment there may be a harness that the subject may put on. There may be additional equipment, such as protective clothing, face guard, gloves, boots and other paraphernalia thought to be needed.

Once a subject is engaged in the apparatus of the invention at the lower end of the tether, maintained at a fixed point in the gravity well, the subject may communicate to the aircraft that all is ready for extraction. At this point the continuing operation is much the same as described above for the embodiments using an attack aircraft, and a harness with a parachute. The aircraft, once all is seen to be ready, rolls out of the circular orbit on any heading seen to be appropriate, and the action of the rollout collapses the gravity well, increasing tension in tether 1803. The subject is lifted gradually from the extraction point, at an increasing velocity, and the winch is operated to bring the subject into the aircraft cargo bay. It is not mandatory that the rollout be into a linear path, as the aircraft may employ other maneuvers that may facilitate the retrieval of the subject as well.

The skilled person will realize that the situations and embodiments described above are entirely exemplary, and that the functionality may be provided in other similar ways. The apparatus described by be different in many ways, but may fall under the breadth of the concepts of the invention. The invention is limited only by the breadth of the claims that follow.

The invention claimed is:

1. A method for extracting a subject, the subject representing a person or package from a ground point, comprising: dropping an extraction pod from a fixed-wing aircraft, the extraction pod carrying a parachute, an extraction harness and first wireless communication circuitry, the extraction pod connected by tether line to the fixed-wing aircraft; tracking descent of the pod to the ground point by software executing on a processor of the fixed-wing aircraft and second wireless communication circuitry at the fixed-wing aircraft; maneuvering the fixed-wing aircraft into a circular orbit at a specific altitude, diameter and airspeed, creating a gravity well in which the tether describes a spiral configuration from a connected point on the fixed-wing aircraft to the pod at a fixed location at the ground point directly below a center-point of the circular orbit of the fixed-wing aircraft, resulting in tension in the tether insufficient to lift the pod; donning the extraction harness and the parachute by the person or package to be extracted; and altering the path and speed of the fixed-wing aircraft in a manner to gradually increase tension in the tether to lift the subject in the harness from the ground point, and to accelerate the subject to an altitude and path enabled to carry the person or package in the harness to a predetermined altitude over a second ground point.

2. The method of claim 1 further comprising a step for tracking tension in the tether by a tension sensor in the tether line, as input to the software executing on the processor in the fixed wing aircraft, and using the tension in the tether as input in an algorithm determining the path and speed of the fixed-wing aircraft.

3. The method of claim 1 wherein the subject notifies the fixed-wing aircraft by the first wireless communication circuitry to the second wireless communication circuitry of a point in time that the subject is ready to be extracted.

4. The method of claim 1 wherein the extraction pod is carried in a canister under a wing of the fixed-wing aircraft, and is dropped by opening the canister and deploying a drag chute connected to the pod, which drag chute pulls the pod from the canister.

5. The method of claim 1 wherein, as the pod is dropped, the tether line, attached to the fixed-wing aircraft, is fed from a bobbin in the pod as the pod descends.

6. The method of claim 1 wherein, as the pod is dropped, the tether line, attached to the pod, is fed from a winch at the fixed wing aircraft.

7. The method of claim 1 wherein the pod comprises drag fins that deploy after the pod is dropped, the drag fins providing stability in the path of the pod.

8. The method of claim 7 wherein the drag fins are movable, and are moved independently by signals from the fixed wing aircraft in response to information acquired in the tracking the descent of the pod, causing the pod to correct trajectory of descent.

9. The method of claim 1 further comprising releasing the harness from the tether at the second ground point, allowing the subject to fall free and deploy the parachute.

10. The method of claim 1 wherein the subject and a person on the fixed wing aircraft are in voice communication during the extraction process.

11. A system for extracting a subject, the subject representing a person or package from a ground point, comprising: a fixed-wing aircraft having a processor executing software and first wireless communication circuitry; an extraction pod carrying a parachute, an extraction harness and second wireless communication circuitry, the extraction pod carried by the fixed wing aircraft and connected by tether line to the fixed-wing aircraft; software, executing from on a processor of the fixed-wing aircraft; wherein the extraction pod is dropped from the fixed-wing aircraft, descent to the ground point is tracked by the software and first wireless communication circuitry at the fixed-wing aircraft, the fixed-wing aircraft is maneuvered into a circular orbit at a specific altitude, diameter and airspeed, creating a gravity well in which the tether line describes a spiral configuration from a connected point on the fixed-wing aircraft to the pod at a fixed location at the ground point directly below a center-point of the circular orbit of the fixed-wing aircraft, resulting in tension in the tether insufficient to lift the pod, the extraction harness and the parachute are donned by a subject, and the path and speed of the fixed-wing aircraft is altered in a manner to gradually increase tension in the tether to lift the subject in the harness from the ground point, and to accelerate the subject to an altitude and path to carry the subject in the harness to a predetermined altitude over a second ground point.

12. The system of claim 11 wherein tension in the tether is tracked by a tension sensor in the tether line, as input to the software executing on the processor in the fixed wing aircraft, and the tension in the tether is used as input in an algorithm to determine the path and speed of the fixed-wing aircraft.

13. The system of claim 11 wherein the subject notifies the fixed-wing aircraft by the first wireless communication circuitry to the second wireless communication circuitry of a point in time that the subject is ready to be extracted.

14. The system of claim 11 comprising a canister wherein the extraction pod is carried under a wing of the fixed-wing aircraft, and is deployed by opening the canister and deploying a drag chute connected to the pod, which drag chute pulls the pod from the canister.

15. The system of claim 11 wherein, as the pod is dropped, the tether line, attached to the fixed-wing aircraft, is fed from a bobbin in the pod as the pod descends.

16. The system of claim 11 wherein, as the pod is dropped, the tether line, attached to the pod, is fed from a winch at the fixed wing aircraft.

17. The system of claim 11 wherein the pod comprises drag fins that deploy after the pod is dropped, the drag fins providing stability in the path of the pod.

18. The system of claim 17 wherein the drag fins are movable, and are moved independently by signals from the fixed wing aircraft in response to information acquired in tracking the descent of the pod, causing the pod to correct trajectory of descent.

19. The system of claim 11 further comprising releasing the harness from the tether at the second ground point, allowing the subject to fall free and deploy the parachute.

20. The system of claim 11 wherein the subject and a person on the fixed wing aircraft are in voice communication during the extraction process.

* * * * *